United States Patent
Lee et al.

(10) Patent No.: US 7,177,243 B2
(45) Date of Patent: Feb. 13, 2007

(54) OPTICAL DISC TRACK ACCESS APPARATUS AND METHOD FOR OPTICAL DISC REPRODUCER

(75) Inventors: Dong Keun Lee, Sungnam (KR); Cheol Jin, Seoul (KR); Jeong Chae Youn, Pyoungtaek (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 10/795,295

(22) Filed: Mar. 9, 2004

(65) Prior Publication Data

US 2004/0218494 A1 Nov. 4, 2004

Related U.S. Application Data

(63) Continuation of application No. 09/271,457, filed on Mar. 18, 1999, now Pat. No. 6,791,915.

(30) Foreign Application Priority Data

| Mar. 18, 1998 | (KR) | ................................. 1998-9371 |
| May 9, 1998 | (KR) | ............................. 1998-16674 |
| Jul. 31, 1998 | (KR) | ............................. 1998-31642 |

(51) Int. Cl.
*G11B 7/00* (2006.01)

(52) U.S. Cl. ............................. 369/44.32; 369/53.18; 369/53.42

(58) Field of Classification Search ............ 369/44.29, 369/44.28, 44.27, 44.41, 44.32, 53.42, 53.18, 369/44.42
See application file for complete search history.

(56) References Cited

U.S. PATENT DOCUMENTS 4,764,911 A 8/1988 Morota et al.

(Continued)

FOREIGN PATENT DOCUMENTS

JP 7-272294 A 10/1995

(Continued)

*Primary Examiner*—Nabil Hindi
(74) *Attorney, Agent, or Firm*—Birch, Stewart, Kolasch, and Birch, LLP

(57) ABSTRACT

The present invention relates to a track access apparatus and a method by which an optical pick-up unit quickly accesses a destination track of an optical disc by controlling a tracking actuator using a back electromotive force by detecting the vibration of an objective lens, the position variation, and the distortion of an actuator which occur when the optical pick-up unit is moved across the tracks of the optical disc at a high speed. In the present invention, there are provided a photodetector for detecting the amount of the beams of a side spot and a main beam spot based on two sub-beams and one main beam, a differential amplifier for differentiating the two signals of the sub-beams and outputting a tracking error signal, a first phase/gain compensation unit for compensating the phase and gain of the tracking error signal, a position detection unit for detecting the position of the objective lens from two signals of the main beam, a second phase/gain compensation unit for compensating the phase and gain of the lens position detection signal, a microcontroller for outputting a switch control signal, a switch for selecting an output of a first or second phase/gain compensation unit based on the switch control signal, a power amplifier for amplifying the output of the switch, and a tracking actuator for driving the objective lens in the track direction and the radial direction of the tracks.

9 Claims, 18 Drawing Sheets

U.S. PATENT DOCUMENTS

| | | |
|---|---|---|
| 5,442,604 A | 8/1995 | Osada |
| 5,768,226 A | 6/1998 | Ogino |
| 5,777,960 A | 7/1998 | Ohno |
| 5,835,459 A | 11/1998 | Takahara et al. |
| 5,862,113 A | 1/1999 | Tsuyuguchi et al. |
| 5,909,414 A | 6/1999 | Ohta |
| 5,920,528 A * | 7/1999 | Ohshima et al. .......... 369/44.29 |
| 5,933,397 A | 8/1999 | Yamashita et al. |
| 6,028,826 A | 2/2000 | Yamamoto et al. |
| 6,044,050 A | 3/2000 | Kuroiwa |
| 6,081,491 A | 6/2000 | Ota et al. |
| 6,141,305 A | 10/2000 | Tsutsui |
| 6,175,540 B1 * | 1/2001 | Kim ........................ 369/44.35 |
| 6,185,171 B1 | 2/2001 | Bassett et al. |
| 6,229,773 B1 * | 5/2001 | Chou ...................... 369/44.28 |
| 6,243,335 B1 * | 6/2001 | Choo ...................... 369/44.28 |
| 6,249,495 B1 | 6/2001 | Okada et al. |
| 6,256,275 B1 | 7/2001 | Eguchi et al. |
| 6,266,301 B1 | 7/2001 | Morimoto |

FOREIGN PATENT DOCUMENTS

| | | |
|---|---|---|
| JP | 9-97439 A | 4/1997 |

* cited by examiner

OPTICAL DISC TRACK ACCESS APPARATUS AND METHOD FOR OPTICAL DISC REPRODUCER

The present application is a continuation of U.S. patent application Ser. No. 09/271,457 filed on Mar. 18, 1999 now U.S. Pat. No. 6,791,915 for which priority is claimed under 35 U.S.C. § 120; and the present application claims priority of Patent Application No. 1998-9371 filed in Republic of Korea on Mar. 18, 1998; Patent Application No. 1998-16674 filed in Republic of Korea on May 9, 1998; and Patent Application No. 1998-31642 filed in Republic of Korea on Jul. 31, 1998, under 35 U.S.C. § 119. The entire contents of each of these applications are herein fully incorporated by reference.

BACKGROUND OF THE INVENTION

1. Field of the Invention

The present invention relates to an optical disc track access apparatus and method, and in particular to an optical disc track access apparatus and method which are capable of quickly accessing a destination track position on an optical disc by detecting a vibration, position variation and level variation of an objective lens and a characteristic value of an actuator when an optical pick-up moves across the tracks of an optical disc at a high speed and of controlling a tracking actuator by generating a back electromotive force corresponding to the detected values.

2. Description of the Background Art

An optical disc reproducer is an apparatus capable of reading a digital data signal recorded on an optical disc and reproducing the thusly recorded data signal. The construction of the optical disc reproducer will be explained with reference to the accompanying drawings.

FIG. 1 illustrates a conventional optical disc reproducer which includes a spindle motor 2 rotating an optical disc 1, a pick-up unit 3 reading a digital data signal recorded on the optical disc 1, a sled motor 4 moving the pick-up unit 3 in the radial direction of the optical disc 1, a motor driving unit 6 driving the motors 2 and 4, a filtering and waveform shaping unit (R/F) 5 receiving a signal detected by the pick-up unit 3 and outputting a filtered and waveform shaped signal, a traverse counter 13 receiving a signal detected by the pick-up unit 3 and counting the number of tracks of the optical disc 1 traversed by the optical pick-up unit 3, a microcontroller 11 receiving an externally inputted instruction signal IN and an output signal of the traverse counter 13, detecting the rotation speed of the sled motor 4 and the movement of the pick-up unit 3 and controlling each circuit forming the optical disc reproducer, a servo unit 7 receiving the filtered and waveform shaped signal from the filtering and waveform shaping unit(R/F) 5, a focus error signal FE and a tracking error signal TE outputted from the pick-up unit 3 in accordance with the control of the microcontroller 11 and controlling the motor driving unit 6 and a digital signal processor 8, the digital signal processor 8 recovering the filtered and waveform shaped signal into a digital signal and processing the thusly recovered signal into a compressed video signal, an MPEG unit 9 decoding the compressed video signal in accordance with the control of the microcontroller 11, and a memory 12 temporarily storing the compressed video signal.

The pick-up unit 3 includes a laser diode LD outputting a light beam having a predetermined wavelength for detecting the digital data signal recorded on the optical disc 1, an objective lens and optical devices for processing the light beam outputted from the laser diode, and a photodetector for receiving the light passed thereto through the objective lens and the optical devices and changing the thusly received light to an electrical signal.

The operation of the thusly constituted conventional optical disc reproducer will now be explained.

When the optical disc reproducer is to reproduce the signals recorded on the optical disc 1, the optical disc 1 is rotated, and the optical pick-up unit 3 is moved for thereby detecting the signals recorded on the optical disc 1 and outputting a high frequency detection signal to the filtered and waveform shaped unit (R/F) 5. The filtering and waveform shaping unit(R/F) 5 shapes the high frequency detection signal. The servo unit 7 which receives the wave-shaped signal detects a synchronous signal from the wave shaped signal, and the synchronous signal is outputted to the digital signal processor 8. The digital signal processor 8 recovers the wave shaped signal from the filtering and waveform shaping unit 5 into an "original" digital signal, and the MPEG unit 9 which receives the recovered digital signal outputs a synchronous video signal, so that the optical disc reproducer reproduces the signals recorded on the optical disc.

The operation wherein the optical disc reproducer searches the data recorded on the optical disc will next be explained.

When a user inputs an instruction signal into the microcontroller for a predetermined data to be reproduced from a track at another position based on the current track of the optical disc, the microcontroller 11 detects the position information, at which the pick-up unit 3 is currently positioned from the digital signal inputted from the digital signal processor 8 for thereby computing a track number of the optical disc corresponding to the position information detected.

At this time, the position information may be classified based on the kind of the disc. If the optical disc 1 is a compact disc(CD), the position information may be a MSB (Minute, Second, block), and if the optical disc 1 is a digital video disc(DVD), the position information may be a sector number.

After the microcontroller computes the track number of the destination track at which the information recorded on the optical disc is to be reproduced, the difference between the current track number at which the pick-up unit is currently positioned, and the computed track number is obtained, and the moving direction is determined based on a predetermined result polarity.

The microcontroller 11 which determines the number of the tracks and the moving direction multiplies the number of the movement tracks by the width of a reference track for thereby computing the destination track position to which the pick-up unit 3 is to be moved and obtaining a distance over which the pick-up unit 3 is to be moved from the position of the destination track. When the servo unit 7 controls the motor driving unit 6 so that the pick-up unit 3 is moved by a predetermined distance in accordance with the control of the microcontroller, the motor driving unit 6 outputs a driving current to the sled motor 4 for a predetermined time in accordance with a control of the servo unit 7. Thereafter, the sled motor 4 is operated, and the pick-up unit 3 is moved to the destination track position in the thusly determined moving direction.

When the pick-up unit 3 is moved to the destination track position of the optical disc and reads the track information corresponding to the moved destination track position and outputs the thusly read track information to the microcontroller 11, the microcontroller 11 judges whether the information requested by the user is the recorded destination track. As a result of the judgement, if the user's requested information is not the recorded destination track, a process whereby the track information is read from a new track position to which the pick-unit 6 is slightly moved is performed until the pick-up unit is moved to the destination track position of the optical disc.

Actually, when the optical disc reproducer searches the information recorded on the optical disc, the sled motor is driven so that the pick-up unit is positioned over the destination track position for a short time, and then the pick-up unit is moved across the tracks of the optical disc. When the pick-up unit is moved across the tracks of the optical disc, a vibration occurs in the optical devices of the pick-up unit, in particular, in the objective lens due to the inertia of the pick-up unit.

At this time, the vibration of the objective lens occurs because the physical characteristic of the pick-up unit affects the actuator which supports the objective lens. In particular, the vibration is increased when the pick-up is accelerated or decelerated. Since the vibration which affects the objective lens directly affects the actuator which controls the focus of the pick-up unit and the tracking operation, it is difficult for the actuator to focus-control the pick-up unit. In addition, since the vibration of the objective lens affects the tracking control after the pick-up unit is moved, much time is required the optical disc reproducer to search the information recorded on the optical disc.

In order to overcome the above-described problems, a conventional tracking control circuit is employed. The construction and operation of the conventional tracking control circuit will next be explained.

FIG. 2 illustrates a first example of a conventional tracking control circuit which includes a photodiode 21 receiving two sub-beams from an optical disc and converting a side spot light amount from the optical disc into electrical signals E and F, a differential amplifier 22 obtaining the difference between the electrical signals E and F and generating a tracking error signal TE(=E−F), a phase/gain compensation unit 23 compensating the phase and gain of the tracking error signal TE and outputting a driving signal, a switch 24 switching the driving signal in accordance with a switching control signal SCS from the microcontroller, a power amplifier 25 amplifying the driving signal from the switch 24, and a tracking actuator 26 receiving the amplified driving signal and adjusting the objective lens in the tracking direction and radial tracking direction of the optical disc. Here, in the tracking actuator 26, a certain distortion may occur due to the vibration of the objective lens.

In the above-described tracking control circuit, when the pick-up unit 3 is moved across the tracks at a high speed, the switching operation of the switch 25 is controlled using the switching control signal SCS outputted from the microcontroller, so that the tracking actuator 27 may not be properly operated due to a noise component generated when the optical pick-up unit moves across the tracks, thereby increasing the vibrations of the objective lens.

In order to overcome the above-described problems, as a second example of a conventional tracking control circuit disclosed in Japanese Patent Publication 7-311956(of Matsushita Electric Ind. Co. Ltd), a back electromotive force corresponding to the destination track is applied to the actuator in order to position the pick-up unit over the destination track for thereby controlling the vibration of the objective lens.

As a third example of a tracking control circuit for overcoming the above-described problems, Japanese Patent Publication 8-77572(of Matsushita Electric Ind. Co. Ltd.) discloses a technique whereby the number of tracks and the moving direction are detected, and a back electromotive force which is a predetermined off-set value corresponding to the detected moving direction and track number is applied to the actuator, so that the vibration of the objective lens of the pick-up unit is controlled.

However, in the above-described conventional tracking control circuits of the optical disc reproducer, mechanical vibrations are generated due to the inertial force generated by the wiring or actuator, and the thusly generated vibrations are increased when the optical pick-up unit is quickly accelerated or decelerated. Therefore, if the level of the vibration of the objective lens exceeds the capacity of the focus control, the focus may become blurred. Even when the focus does not become blurred, it is impossible to fully control the tracking operation, so that it takes a long time to search the information recorded on the optical disc.

In the conventional tracking control circuit of the optical disc reproducer, when the optical pick-up unit is moved over the tracks at a high speed, and when controlling the vibrations of the objective lens due to the inertia force which occurs when the optical pick-up unit is quickly accelerated or decelerated, the tracking control may exceed a predetermined limit, so that it is impossible to accurately control the focus.

Therefore, in the conventional tracking control circuit, when the objective lens is vibrated due to the inertial force, a predetermined time delay occurs from the time after the optical pick-up unit is moved until the time before the tracking servo is again under full control, so that the time required for accessing the destination track of the optical disc is increased.

In the optical disc reproducer disclosed in Japanese Patent Publications 7-311956 and 8-77572, when the optical pick-up unit is moved over the tracks of the optical disc in order to access a destination track of the optical disc at high speed, a maximum kick pulse is applied irrespective of the distance over which the optical pick-up unit is moved, and a back electromotive force which varies the kick pulses in accordance with the destination track delays the time for accessing the destination track.

In addition, in the conventional optical disc reproducer, a servo loop is needed for implementing a servo control by detecting the level of the vibration, thereby increasing the fabrication cost of the system.

SUMMARY OF THE INVENTION

Accordingly, it is an object of the present invention to provide an optical disc track access apparatus and a method of the same which overcome the aforementioned problems encountered in the background art.

It is another object of the present invention to provide an optical disc track access apparatus for an optical disc reproducer by which an optical pick-up unit can quickly access a destination track of an optical disc by accurately detecting a signal corresponding to the level of a horizontal vibration with respect to the optical axis of an objective lens when the objective lens is in a parallel state when an optical pick-up unit of the optical disc reproducer is moved across the tracks of an optical disc, by adjusting the phase and gain of the detected signal and applying a back electromotive force to an actuator of the disc reproducer for compensating the level of the vibrations.

It is another object of the present invention to provide an optical disc track access method for an optical disc reproducer by which an optical pick-up unit can quickly access a destination track of an optical disc by accurately detecting a signal corresponding to the level of a horizontal vibration with respect to the objective lens axis when the objective lens is in a parallel state when an optical pick-up unit of the optical disc reproducer is moved across the tracks of an optical disc, by adjusting the phase and gain of the detected signal and applying a back electromotive force to an actuator of the optical disc reproducer for compensating the level of the vibrations.

It is another object of the present invention to provide a method by which an optical pick-up unit of an optical disc reproducer can quickly access the destination track of an optical disc on which an information is recorded by accurately detecting a signal corresponding to the horizontal vibration level with respect to the objective lens axis when an objective lens is in a parallel state, by adjusting the phase and gain of the detection signal and applying a back electromotive force compensation control signal to an actuator of the optical disc reproducer corresponding to the slope of the detection signal.

It is another object of the present invention to provide a method by which an optical pick-up unit of an optical disc reproducer can quickly access the destination track of the optical disc on which an information is recorded by accurately detecting a signal corresponding to the level of the vibrations with respect to an objective lens axis when an objective lens is in a parallel state, adjusting the phase and gain of the detection signal and applying a back electromotive signal to an actuator of the optical disc reproducer corresponding to the level of the detection signal.

It is another object of the present invention to provide a method by which an optical pick-up unit of an optical disc reproducer can quickly access a destination track of the optical disc on which an information is recorded by determining a characteristic value of an actuator of an optical disc reproducer in accordance with a moving speed of a sled motor of the optical disc reproducer and applying a back electromotive force to the actuator corresponding to the force applied to the actuator and a distortion of the actuator based on the thusly determined characteristic value.

In order to achieve the above objects, there is a provided an optical disc track access apparatus for an optical disc reproducer according to a first embodiment of the present invention which includes an optical pick-up moving unit for moving an optical pick-up unit of the optical disc reproducer in a radial direction of a track of an optical disc, a detection unit for detecting a vibration of an objective lens of the optical pick-up unit based on a reflected main light beam detected by the optical pick-up unit, and a control unit for outputting a compensation signal to the optical pickup moving unit for decreasing the vibration of the objective lens based on an output signal from the detection unit and thereby controlling the vibration of the objective lens.

In order to achieve the above objects, there is also a provided an optical disc track access apparatus for an optical disc reproducer according to a second embodiment of the present invention which includes an electrical signal generation unit for generating an electrical signal of a resonant frequency range detected by an optical pick-up unit of the optical disc reproducer which moves in the radial direction of the tracks of an optical disc and having a resonant frequency range of a tracking actuator of the optical disc reproducer, and a control unit for controlling the driving operation of the tracking actuator in accordance with the thusly generated electrical signals.

In order to achieve the above objects, there is additionally a provided an optical disc track access apparatus for an optical disc reproducer according to a third embodiment of the present invention which includes a first tracking control unit for outputting a first tracking control signal based on a first auxiliary signal generated during the track direction movement of an optical pick-up unit of the optical disc reproducer, a second tracking control unit for outputting a second tracking control signal in accordance with a second auxiliary signal of a frequency lower than the frequency of the first auxiliary signal and generated based on the movement of the optical disc in the radial direction of the tracks of the optical pick-up unit, and a switching unit for selecting one among the first and second tracking control signals and outputting the thusly selected signal in accordance with a track search request.

In order to achieve the above objects, there is further a provided an optical disc track access apparatus for an optical disc reproducer according to a fourth embodiment of the present invention which includes an auxiliary signal detection unit for detecting an auxiliary signal of a resonant frequency range of a tracking actuator of the optical disc reproducer based on the detection beam amount a plurality of beam spot regions reflected from an optical disc, an error signal generation unit for generating a tracking error signal in accordance therewith, a back electromotive force generation unit for generating a back electromotive force corresponding to the thusly generated tracking error signal, and a driving control unit for controlling a driving signal of the tracking actuator in accordance with the thusly generated electromotive force.

In order to achieve the above objects, there is still further a provided an optical disc track access method for an optical disc reproducer according to a fifth embodiment of the present invention which includes a detection step for detecting an auxiliary signal of a resonant frequency range of a tracking actuator of the optical disc reproducer detected by the optical pick-up unit of the optical disc reproducer which moves in a radial direction of the tracks of an optical disc, and a control step for controlling the driving operation of the tracking actuator in accordance with the detected auxiliary signal.

In order to achieve the above objects, there is also a provided an optical disc track access method for an optical disc reproducer according to a sixth embodiment of the present invention which includes a first step for outputting a tracking control signal based on a first auxiliary signal generated when an optical pick-up unit of the optical disc reproducer is moved in the track direction of an optical disc, a second step for outputting a tracking control signal in accordance with a second auxiliary signal of a frequency lower than the frequency of a first auxiliary signal and generated when the optical pick-up unit is moved in a radial direction of the tracks of the optical disc, and a third step for selecting one signal among a plurality of tracking control signals in accordance with a track search request and outputting the thusly selected signal.

In order to achieve the above objects, there is also a provided an optical disc track access control method for an optical disc reproducer according to a seven embodiment of the present invention which includes a setting step for setting a tracking reference value corresponding to a first auxiliary signal generated when an optical pick-up unit is moved in the track direction of an optical disc, a comparison step for detecting a second auxiliary signal generated when the optical pick-up unit of the optical disc reproducer is moved in the radial direction of the tracks of the optical disc and comparing the thusly detected second auxiliary signal with a tracking reference signal, and an output step for outputting a tracking control signal corresponding to a result of the comparison.

In order to achieve the above objects, there is further a provided an optical disc track access method for an optical disc reproducer according to a eighth embodiment of the present invention which includes a detection step for detecting a second auxiliary signal generated when an optical pick-up unit of the optical disc reproducer is moved in the radial direction of the tracks of an optical disc when an mode is changed to a fine search mode, and an output step for outputting a tracking control signal by which a number of the jump tracks per moving step of the optical pick-up unit is varied in accordance with a result of the detection.

In order to achieve the above objects, there is also a provided an optical disc track access method for an optical disc reproducer according to an ninth embodiment of the present invention which includes determining a current acceleration in accordance with the variation of the current moving speed of an actuator of the optical disc reproducer, determining a degree of the distortion of the actuator corresponding to the current acceleration based on a previously determined characteristic value of the actuator, and controlling the driving operation of the actuator in accordance with the thusly determined degree of the distortion.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
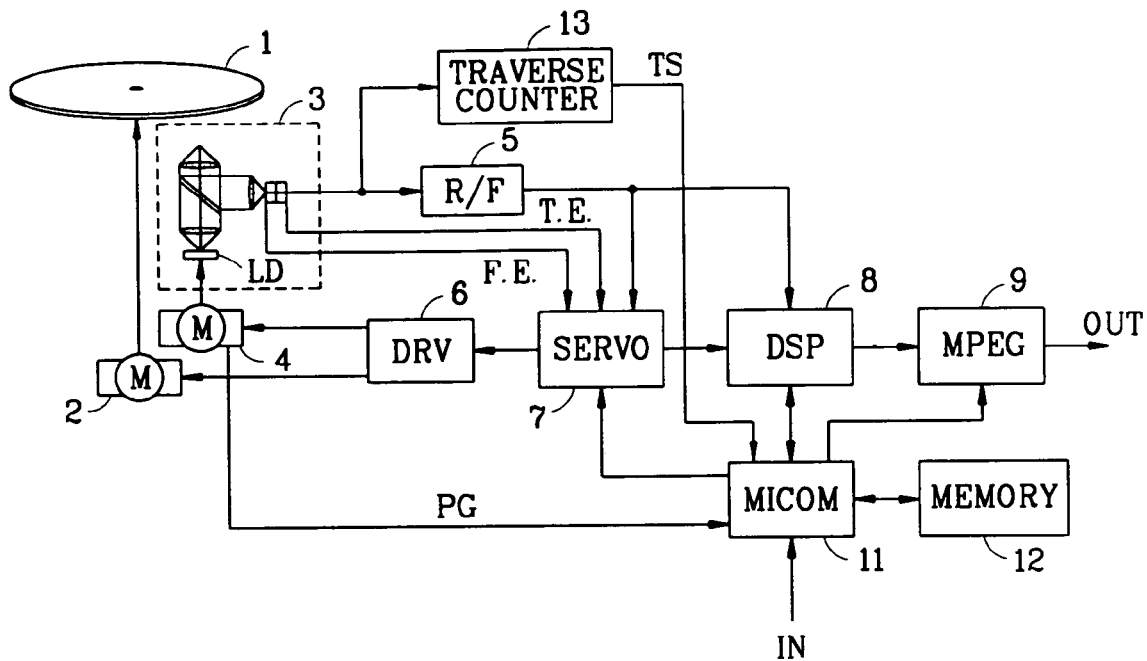
FIG. 1 is a schematic block diagram illustrating the components of a conventional optical disc reproducer.
Figure 2:
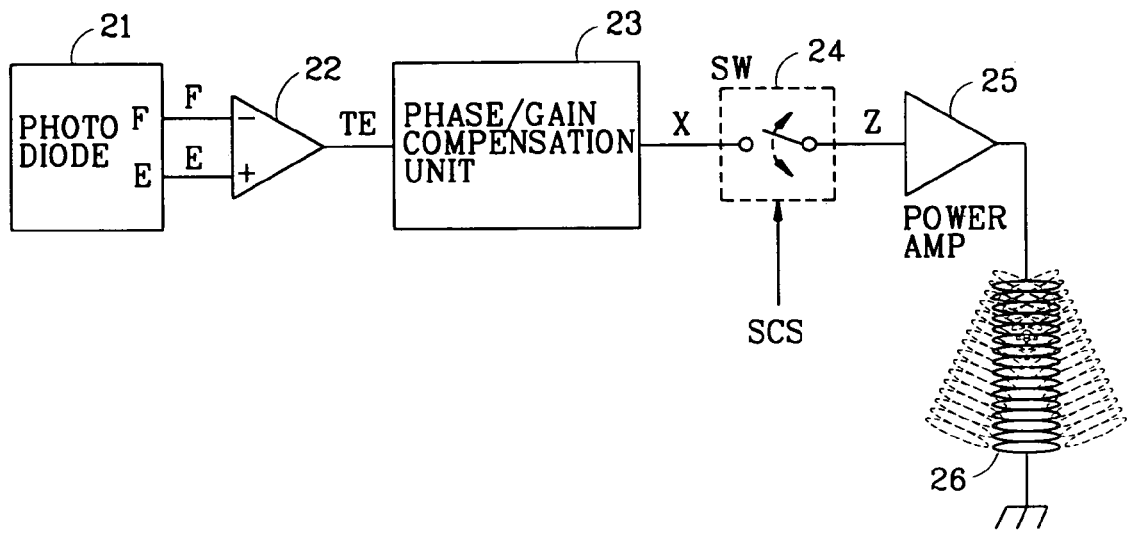
FIG. 2 is a schematic block diagram illustrating the components of a conventional tracking control circuit.
Figure 3:
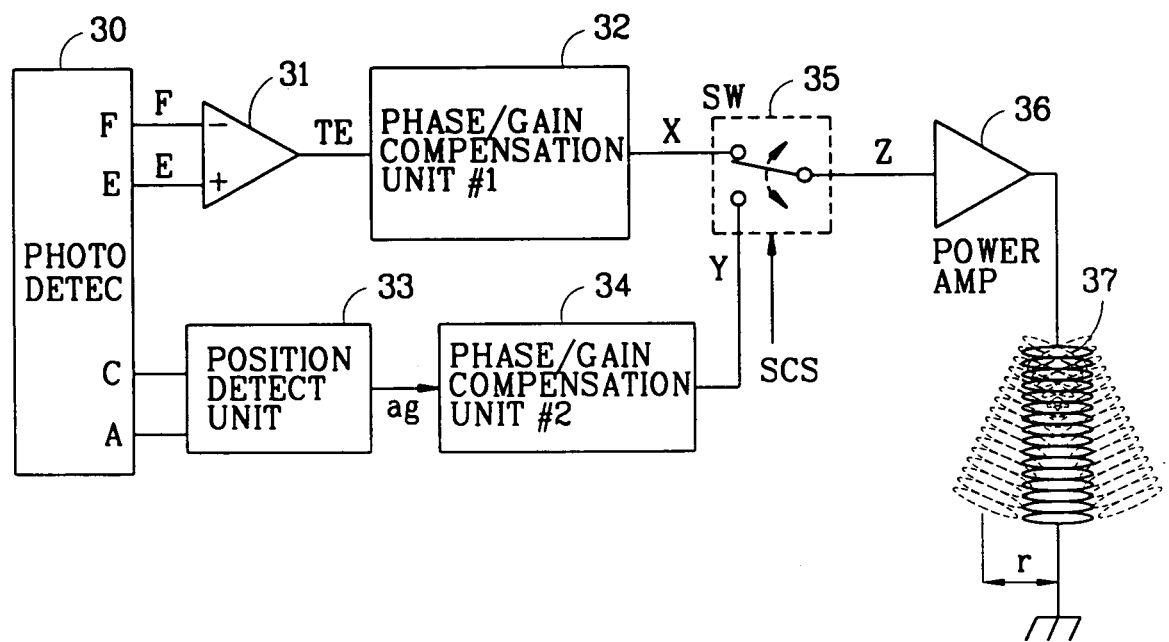
FIG. 3 is a schematic block diagram illustrating the components of a track access control apparatus according to a first embodiment of the present invention.

As shown in FIG. 3, the track access control apparatus according to a first embodiment of the present invention includes a photodetector 30 detecting two sub-beams E and F and one main beam reflected from side spots and a main spot of an optical disc, respectively, and outputting corresponding electrical signals (E, F, A, B, C, D: since the one main beam is made incident onto a segmented photodetector), a differential amplifier 31 outputting tracking error signal TE (=E−F) from the electrical signals E and F from the photodetector 30, a first phase/gain compensator unit 32 compensating the phase and gain of the tracking error signal TE and outputting a first driving signal, a position detection unit 33 receiving the electrical signals A and C from the photodetector 30, detecting therefrom the position of the objective lens and outputting a vibration level signal of the objective lens, a second phase/gain compensation circuit 34 compensating the phase and gain of the vibration level signal of the objective lens from the position detection unit 33 and outputting a second driving signal, a switch 35 selecting and outputting the first driving signal or the second driving signal in accordance with a switching control signal SCS from a microcontroller (not shown), a power amplifier 36 amplifying the first driving signal or the second driving signal from the switch 35, and a tracking actuator 37 adjusting the objective lens in the tracking direction and radial direction of the tracks of the optical disc in accordance with the amplified first driving signal or the amplified second driving signal. In the drawings, "r" indicated at the actuator 37 represents the distortion (or vibration width) of the actuator 37.

Figure 4A:
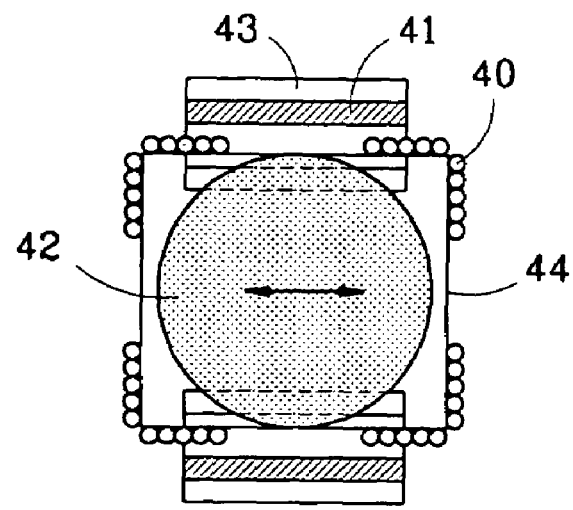
FIGS. 4A and 4B are plan and side views, respectively, illustrating a tracking actuator for driving an objective lens.
Figure 4B:
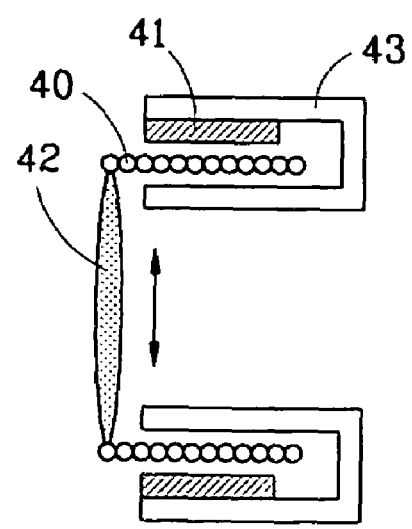

FIGS. 4A and 4B illustrate the tracking actuator for driving the objective lens which includes an objective lens 42 mounted with a bobbin 44 on which is wound a coil 40 receiving a current applied thereto for adjusting the position of the objective lens 42 in accordance with the inputted current, and a magnetic member 43 with a magnet 41 forming a magnetic field.

Figure 5C:
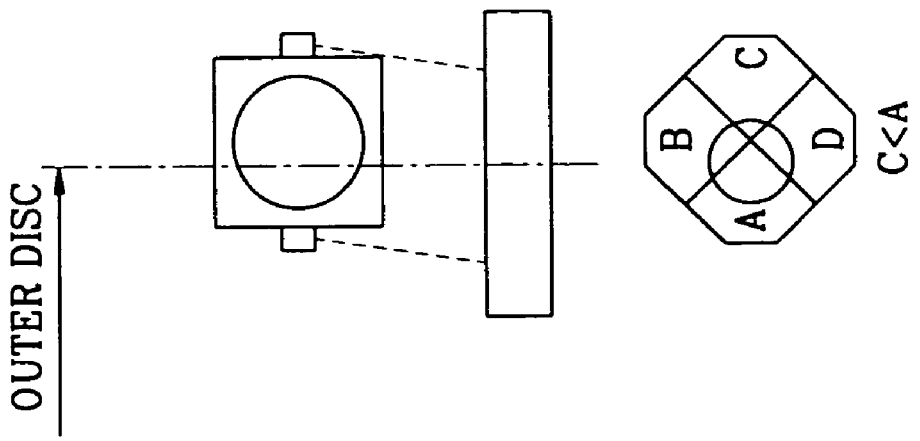
FIGS. 5A through 5C are respective views illustrating a trajectory of a main beam inputted into a photodetector in accordance with a position variation of an optical device of an optical pick-up unit.
Figure 5B:
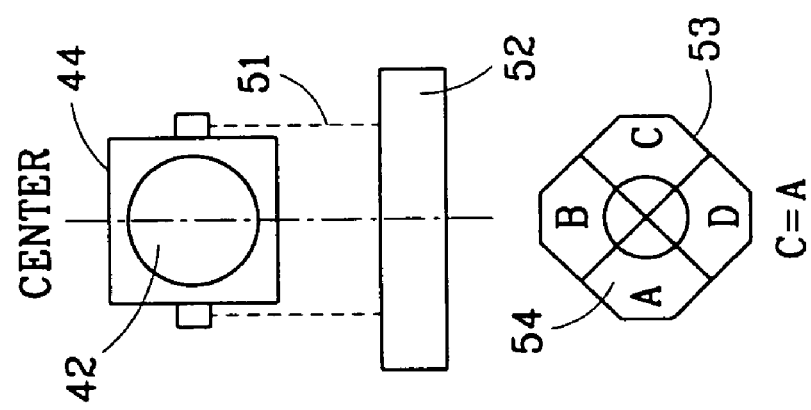
Figure 5A:
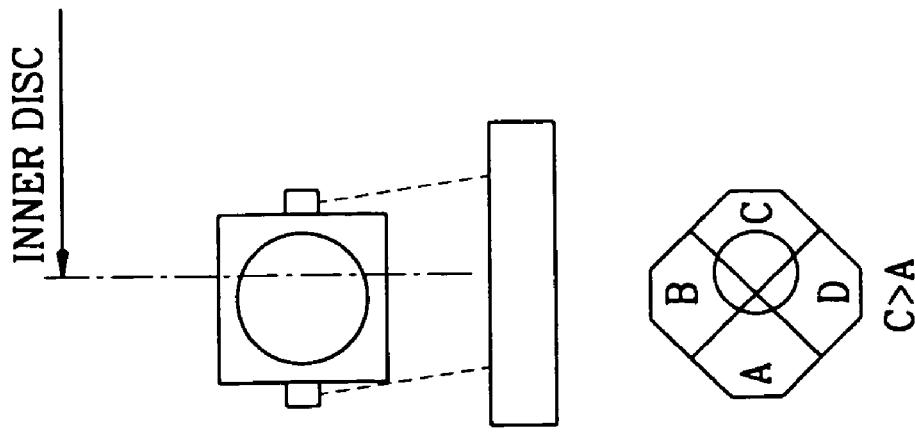

FIGS. 5A through 5C illustrate the trajectories of the main beam inputted into the photodetector in accordance with a position variation of the optical devices of the optical pick-up unit. In each upper drawing of FIGS. 5A through 5C, there are shown the objective lens 42, a bobbin 44 fixing the objective lens 42, a support frame 52, and wires 51 connecting the support frame and the bobbin 44. In each lower drawing, there are shown a photodetector 53 split onto four segments 54 as A, B, C and D onto which the main beam reflected by the optical disc and passed through the objective lens is inputted.

In the segmented photodetector 53, when the optical pick-up unit is moved toward the destination track position of the optical disc, the spot trajectory of the main beam is inputted along the axis of the objective lens, and it is judged whether the optical pick-up unit is positioned over the destination track position or is offset towards the inside or outside of the optical disc about the destination track position. If the objective lens 42 is not offset towards the inner direction of the optical disc with respect to the beams inputted onto the photodetector segments A and C, the position is determined based on the degree of offset towards the outer direction. If there is a difference in the detected intensities of the beams, it is possible therefrom to detect the position of the objective lens. The above-mentioned detection technique will now be explained.

FIG. 5B illustrates a trajectory wherein the spot trajectory of the main beam reflected by the optical disc and then passed through the objective lens is formed on the center of the photodetector 53. In the photodetector 53, since the beam amount incident on the segment A and the beam amount incident on the segment C are the same, it is possible to detect that the objective lens 42 is not offset toward the inner or outer directions of the optical disc.

FIG. 5A illustrates that the spot trajectory of the main beam reflected by the optical disc and passed through the objective lens is offset towards segment C of the photodetector 53. In the photodetector 53, since the beam amount incident on the segment A is smaller than the beam amount incident on the segment C, it is possible to detect that the objective lens 42 is offset towards the inner direction of the optical disc. As shown in FIG. 5C, the photodetector 53 detects the case opposite to that shown in FIG. 5A.

Figure 6:
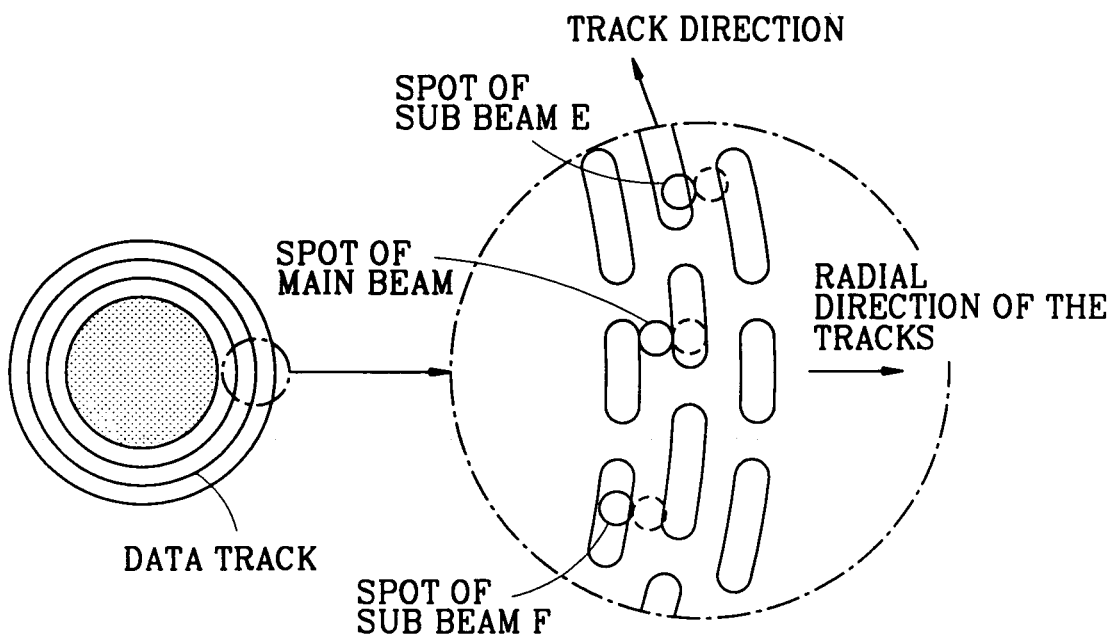
FIG. 6 is a view illustrating three light spots on the optical disc, which are generated by an optical pick-up unit using a 3-beam method.

FIG. 6 illustrates the light beam spots that the optical pick-up unit forms on a optical disc using 3-beam method.

In the optical pick-up technique of the optical disc reproducer using a 3-beam method, the data signal recorded on the optical disc is reproduced using one main beam positioned at the center portion, and two sub-beams E and F respectively formed towards the inner and outer portions of the main beam and generating a track error signal.

In the optical pick-up unit of an optical disc reproducer using the 3-beam method, when the optical pick-up unit is moved from the inner portion to the outer portion of the data track of the optical disc, then the spots of the three beams are moved from the positions indicated by solid lines to the positions indicated by the dashed lines, so that the spot of the main beam is positioned on the track for thereby reading the data signal therefrom. In addition, the sub-beams E and F are slightly positioned on the land in which there are pits. In this land, the sub-beams reflected by the land portion are converted into the electrical signals by the photodetector and then these signals are inputted into the differential amplifier. At this time, at the dashed line position of the sub-beams, since the same amount of the beams is detected, the track error signal is 0. Here, the sub-beams E and F are formed separately for the reason that the detection signal can be accurately detected for thereby preventing crosstalk between the neighboring tracks.

Figure 7:
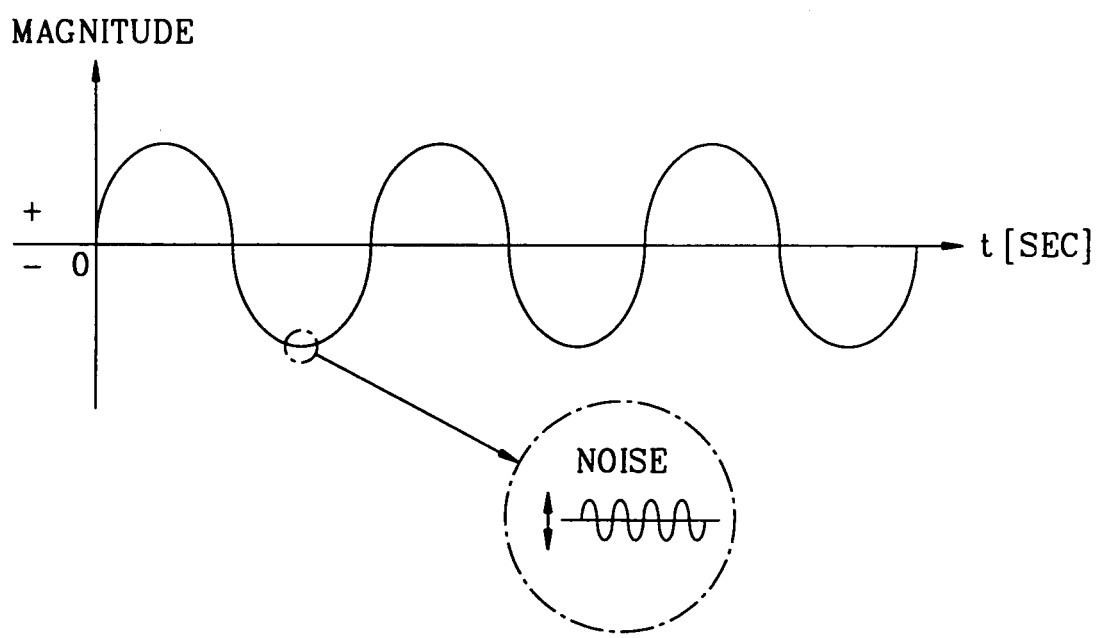
FIG. 7 is a waveform diagram illustrating an output signal of a position detection unit.

FIG. 7 illustrates the waveform of an output signal of the photodetector. When the optical pick-up unit moves across the tracks of the optical disc, the magnitude and polarity of the output signal of the photodetector are changed in accordance with the variation of the beam spot. For example, if the output of the photodetector is a positive value(+), it means that the objective lens is offset towards the inner direction, and if the output of the photodetector is a negative value(−), it means that the objective lens is offset towards the outer direction. In view of the vibration of the objective lens, if the objective lens is offset, the distortion degree and distortion distance of the actuator will differ based on the offset distance.

When enlarging the waveform of the output signal of the photodetector, as indicated within the dashed circle, a low level signal component is revealed. This low level signal is a noise component which is generated when the position of the main beam is changed due to the vibration of the objective lens when the optical pick-up unit is moved across the tracks at a high speed.

The reasons for the generation of the noise component will be explained in more detail.

The vibration of the objective lens occurs in relation with the oscillation period of the tracking actuator of the optical pick-up unit. The thusly generated vibrations are in the oscillation frequency range of the tracking actuator engaged with the objective lens. Generally, since the vibration of the optical pick-up unit has a frequency characteristic of tens of Hz, for example, since the vibration of the 3-beam optical pick-up unit includes the above-described characteristic, and the error signal which is determined by whether the main beam is positioned on the tracks is generated in proportion to the rotation speed of the sled motor when the optical pick-up unit is moved across the tracks at a high speed, frequencies of at least tens of kHz are generated. Therefore, the vibrations of the objective lens may change the position of the main beam for thereby generating the noise components. The thusly generated noise components are filtered.

Figure 8A:
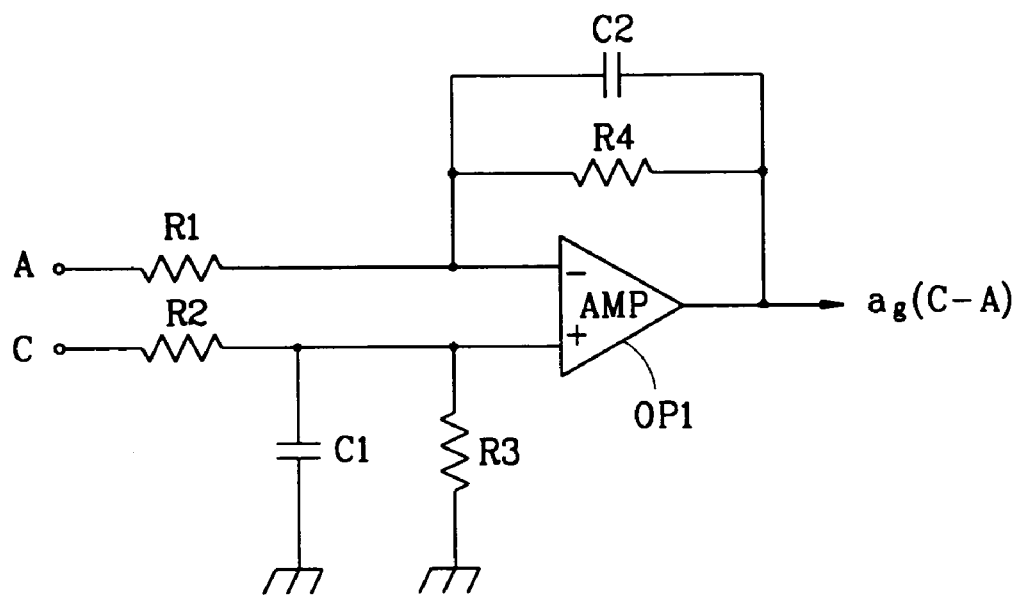
FIG. 8A is a schematic circuit diagram illustrating a position detection unit.

FIG. 8(A) illustrates an exemplary circuit of the position detection unit 33, which is formed of a differential amplification circuit for receiving electrical signals A and C and outputting a position detection signal ag(C−A).

The differential amplification circuit comprising the position detection unit includes an operational amplifier OP1 which receives the signals A and C at its respective inverting and non-inverting input terminals via respective input series resistors R1 and R2. A capacitor C1 in parallel with a resistor R3 is connected between the non-inverting input terminal and ground for bypassing high frequency noise components riding on the main beam signal. Similarly, a negative feedback circuit composed of a capacitor C2 in parallel with a resistor R4 is connected between the output terminal and inverting input terminal of operational amplifier OP1 for applying negative feedback based on the position detection signal ag(C–A) outputted from the output terminal of operational amplifier OP1.

Figure 8B:
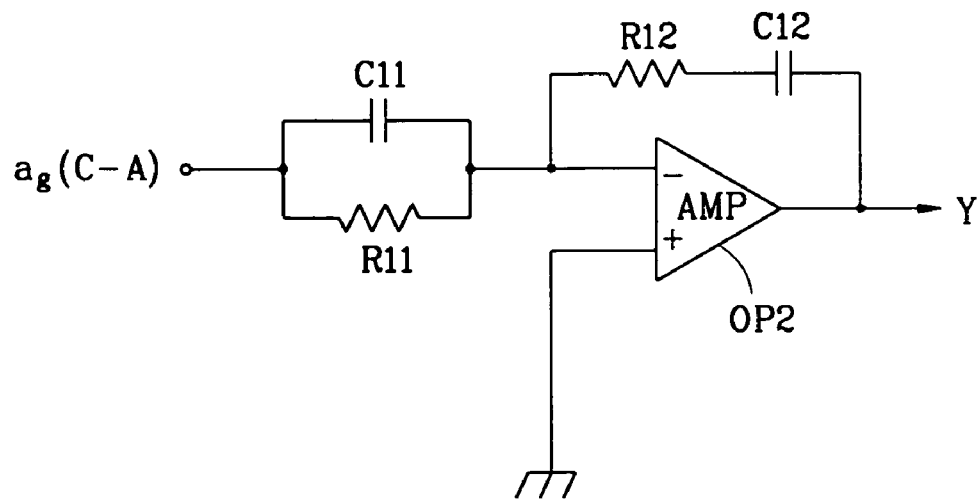
FIG. 8B is a schematic circuit diagram illustrating a second phase/gain compensation unit.

FIG. 8B illustrates an exemplary circuit of the second phase/gain compensation unit 34 which is formed of a integrator which integrates the signal ag(C–A) from the position detection unit 33 over time, which negatively feeds back so that the tracking actuator operates in the reverse direction of the optical lens offset and compensates the phase gain of the control loop so as not to be oscillated under the operation. The integrator circuit includes an operational amplifier )OP2 having its non-inverting input terminal connected to ground. The position detection signal ag(C–A) is applied to the inverting input terminal of operational amplifier OP2 via an input filter composed of a capacitor C11 and a resistor R11 connected in parallel, for blocking noise in the position detection signal ag. A buffer resistor R12 is connected in series between the inverting input terminal of operational amplifier OP2 and one terminal of a capacitor C12 the other terminal of which is connected to the output terminal of operational amplifier OP2 at which the phase/gain compensation driving signal is outputted.

Figure 9:
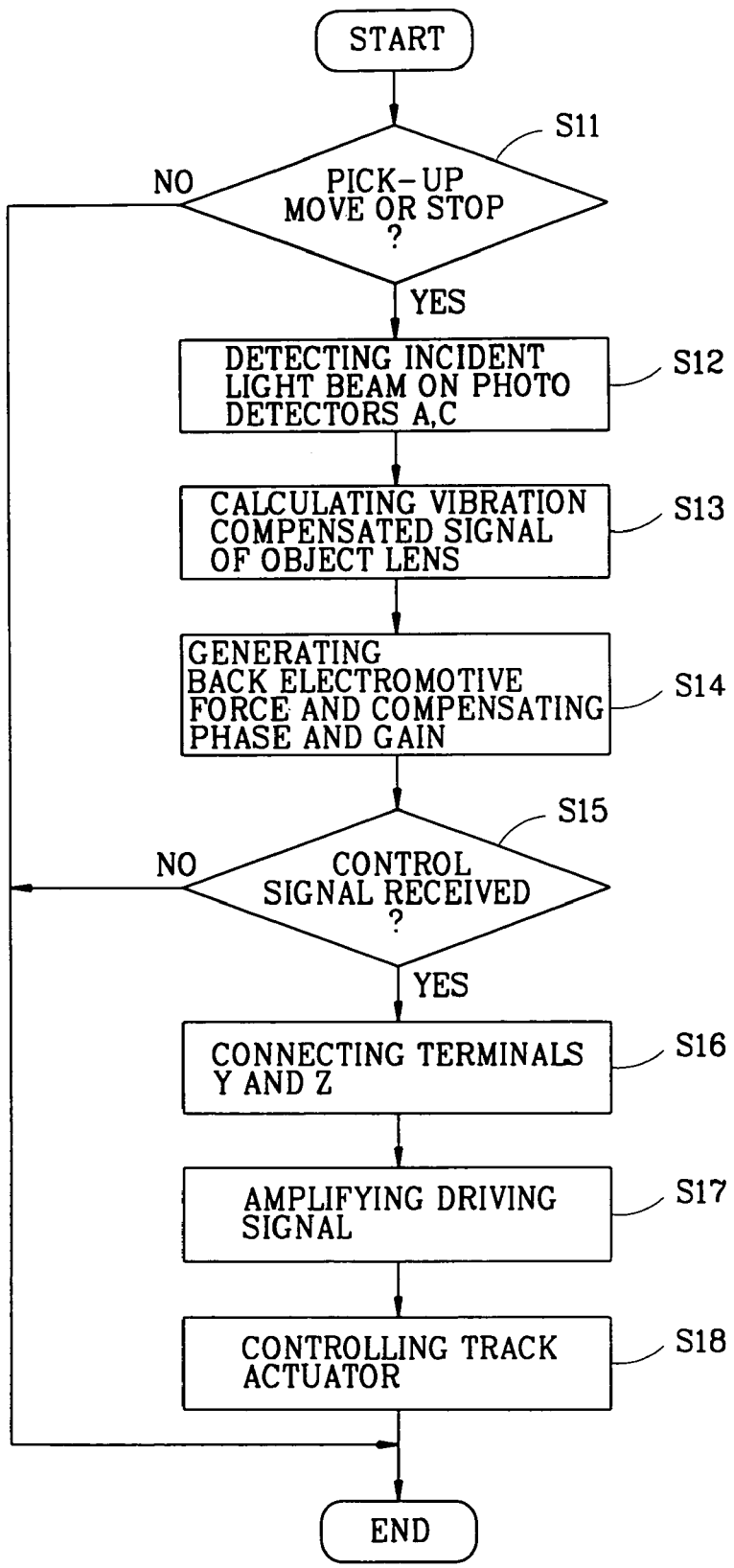
FIG. 9 is a flow chart illustrating a track access control method of an optical disc reproducer for compensating a vibration of an objective lens according to a second embodiment of the present invention.

FIG. 9 illustrates the steps for implementing a tracking access method for compensating the vibration of the objective lens according to a second embodiment of the present invention. In this method in Step S11, it is judged whether the pick-up unit is moved. If it is judged that the pick-up unit is moved, the beams A and C inputted into the photodetector are detected in Step S12. The objective lens vibration signal is extracted from the electrical signals corresponding to a different beam amount in Step S13. Thereafter in Step S14, the driving signal is generated by compensating the phase and gain of the vibration level signal of the objective lens for adjusting the position of the objective lens. Next, in Step S15, it is judged whether the switching control signal SCS is inputted from the microcontroller. If it is judged that the switching control signal SCS is inputted, the driving signal is outputted by switching the switch in Step S16. Next, the driving signal is amplified in Step S17, and the driving signal is outputted to the tracking actuator in Step S18 for thereby controlling the position of the objective lens.

Figure 10:
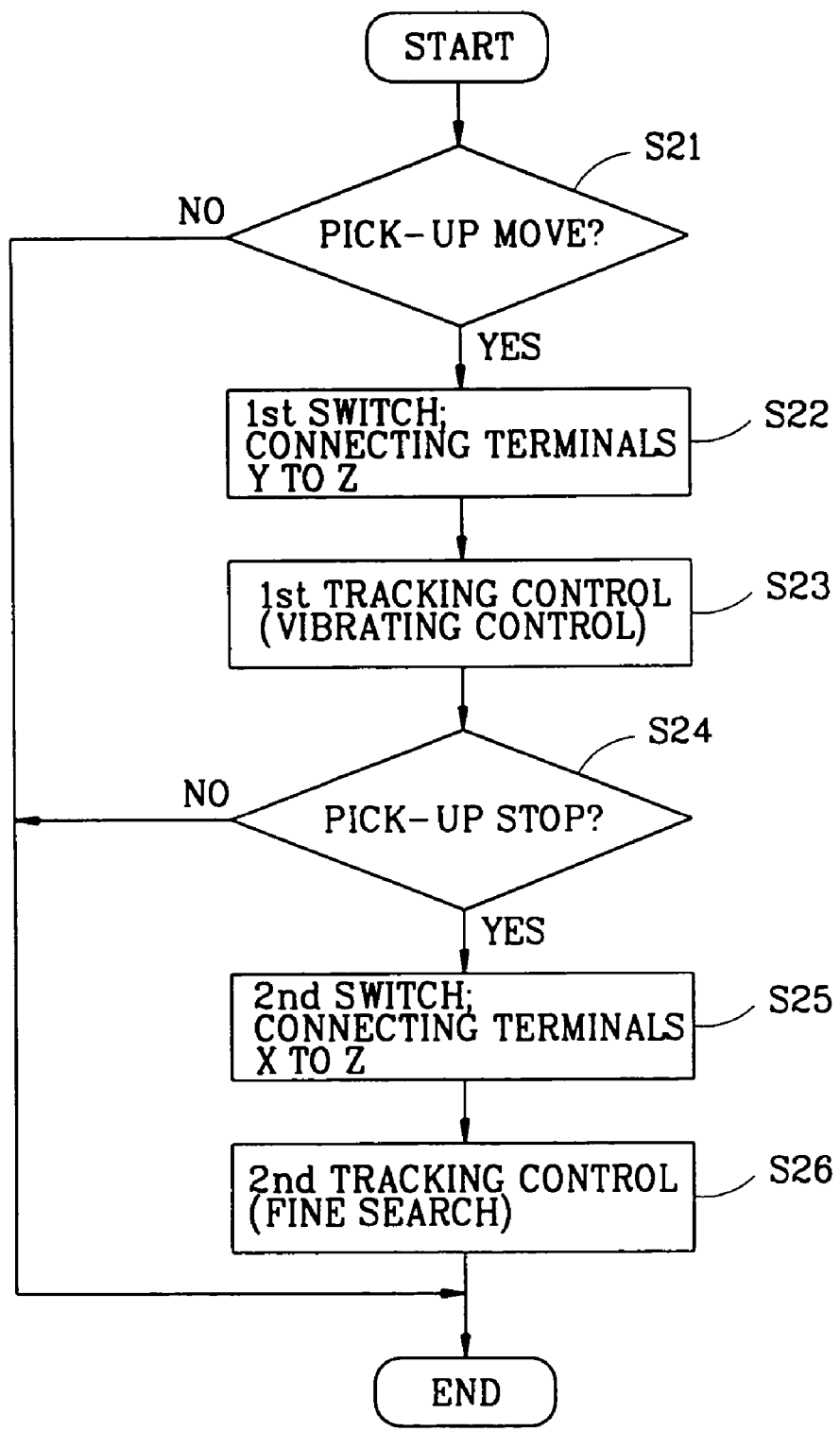
FIG. 10 is a flow chart illustrating a track access control method of an optical disc reproducer according to a third embodiment of the present invention.

FIG. 10 illustrates the track access method for an optical disc according to a third embodiment of the present invention. In Step S21, it is judged whether the optical pick-up unit is moved across the tracks for searching the data recorded on the optical disc. If it is judged that the optical pick-up unit is moved, the Y-input terminal of the switch is connected with the Z-output terminal in Step S22 for thereby implementing a first tracking control for controlling the vibration of the objective lens in Step S23.

Next, if it is judged in Step S24 that the pick-up unit is not moved, the X-input terminal of the switch is connected with the Z-output terminal in Step S25 for thereby performing a second tracking control(fine search) in Step S26. The first and second tracking control methodologies will be explained with reference to FIG. 11.

Figure 11A:
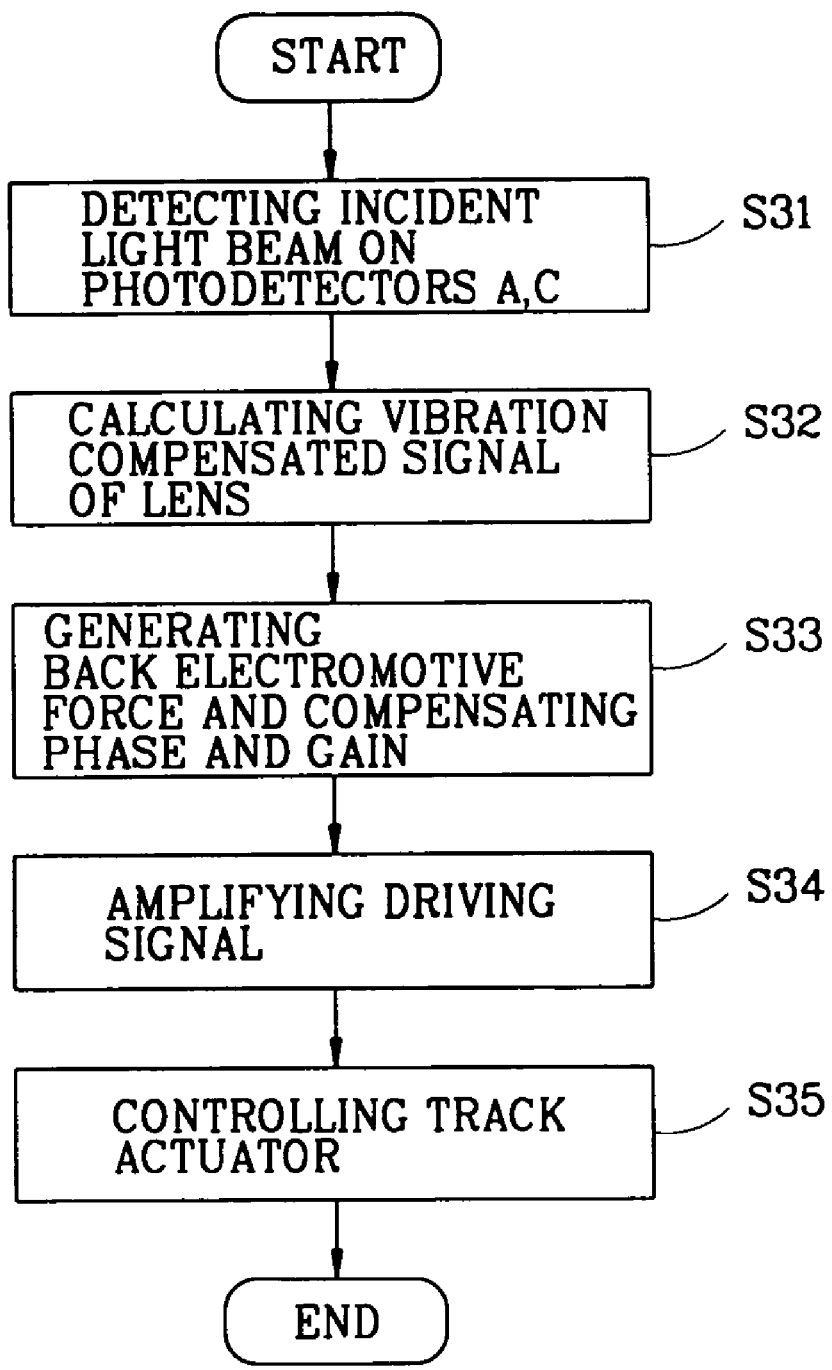
FIG. 11A is a flow chart illustrating a first tracking control step(coarse search) in the method of FIG. 10.

FIG. 11A is a flowchart illustrating the sub-steps for implementing the first tracking control method(coarse search) of the method of FIG. 10. In Step S31, if the amount of the main beam reflected by the optical disc is detected, and then the electrical signals are outputted, the vibration amount signal of the objective lens is generated based on the electrical signals in Step S32. A driving signal is generated by receiving the vibration level signal and compensating the phase and gain for generating a back electromotive force in Step S33, and then the driving signal is amplified in Step S34. The thusly amplified driving signal is applied to the actuator for thereby controlling the tracking of the optical pick-up unit in Step S35.

Figure 11B:
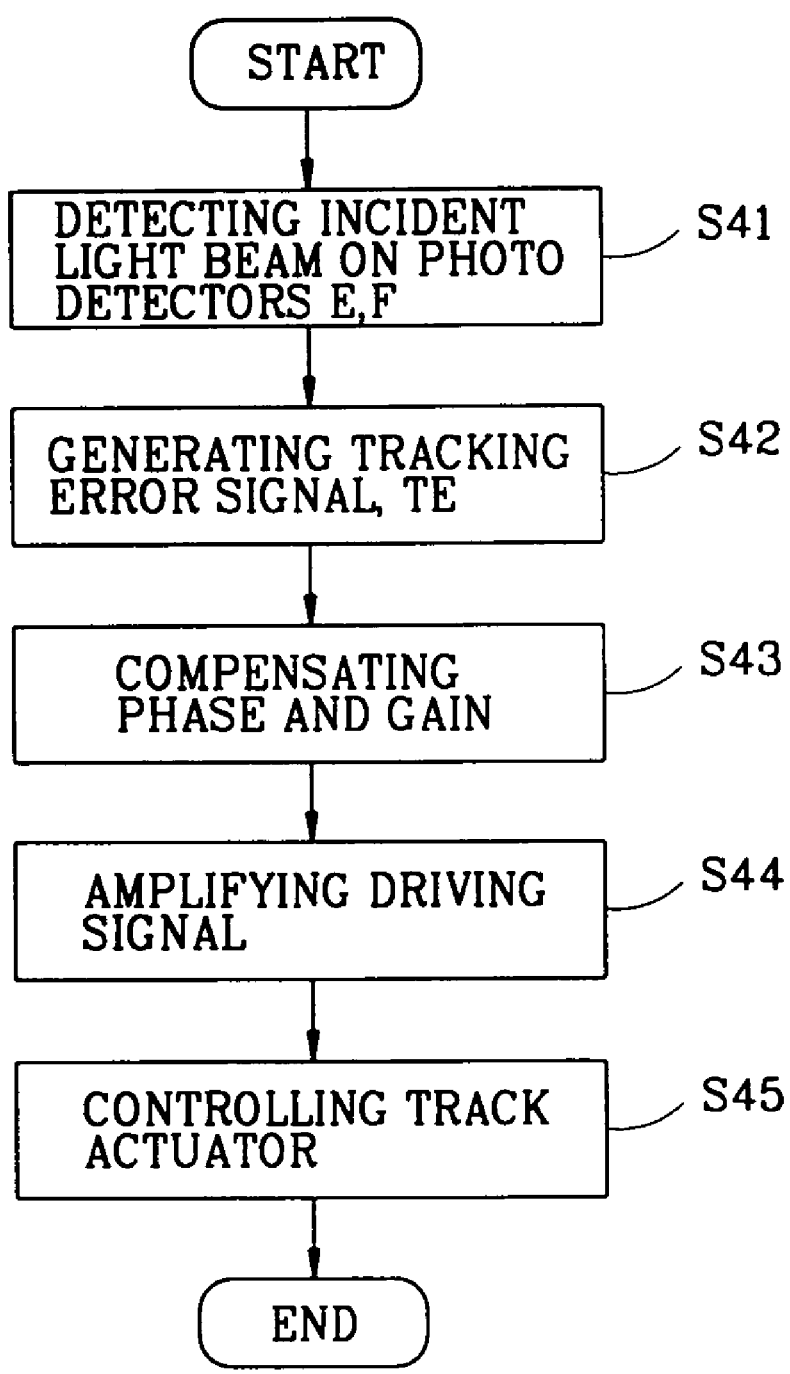
FIG. 11B is a flow chart illustrating a second tracking control step(fine search) in the method of FIG. 10.

FIG. 11B illustrates the sub-steps for implementing a second tracking control(fine search) in the method of FIG. 10. In Step S41, when the photodetector which detects the amount of the beam based on two sub-beams outputs an electrical signal, the electrical signals are inputted, and the tracking error signals E–F are generated in Step S42, and the phase and gain of the error signal are compensated in Step S43, and the compensated error signal is amplified for thereby generating a driving signal in Step S44, and then the amplified driving signal is applied to the actuator for thereby controlling the tracking of the optical pick-up unit in Step S45.

The method for controlling the tracking using the output signal from the position detection unit of the objective lens, the track access method for controlling the tracking using the time-based variation(slope) of the objective lens position, and the track access method for controlling the tracking using the vibration level variation of the objective lens will be explained as follows.

Figure 12A:
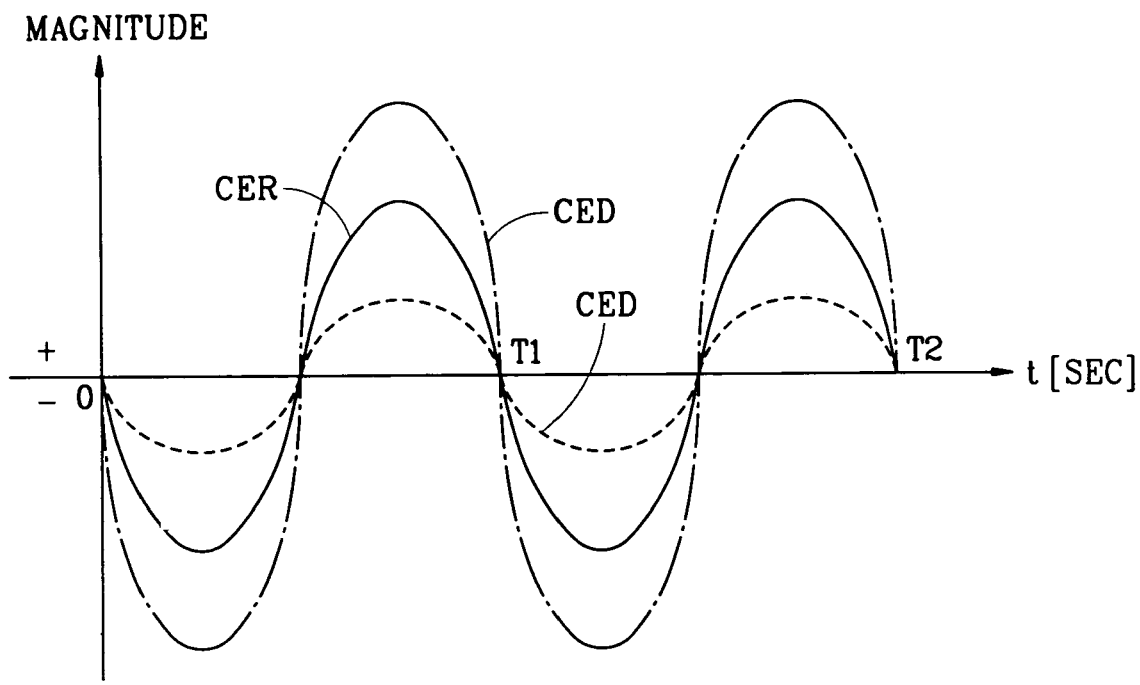
FIG. 12A illustrates the output signal waveforms of the photodetector for detecting the position of the objective lens when the optical pick-up unit of the optical disc reproducer moves in the radial direction of the tracks of the optical disc in the stable state.

FIG. 12A illustrates the output signal waveforms of the photodetector for detecting the position of the objective lens when the optical pick-up unit of the optical disc reproducer moves in the radial direction of the tracks of the optical disc in the stable state.

When the optical pick-up unit moves in the radial direction of the tracks in a normal(stable) state, the photodetector of the optical pick-up unit due to the vibration of the actuator having an inherent resonant frequency (1/T1), outputs the detected signals CED1 and CED2 and so on, which each has a different magnitude according to the moving speeds of the optical pick-up unit of the optical disc reproducer. Therefore, the microcontroller calculates an average value CER of the detected signals CED1 and CED2, as a reference value.

Figure 12B:
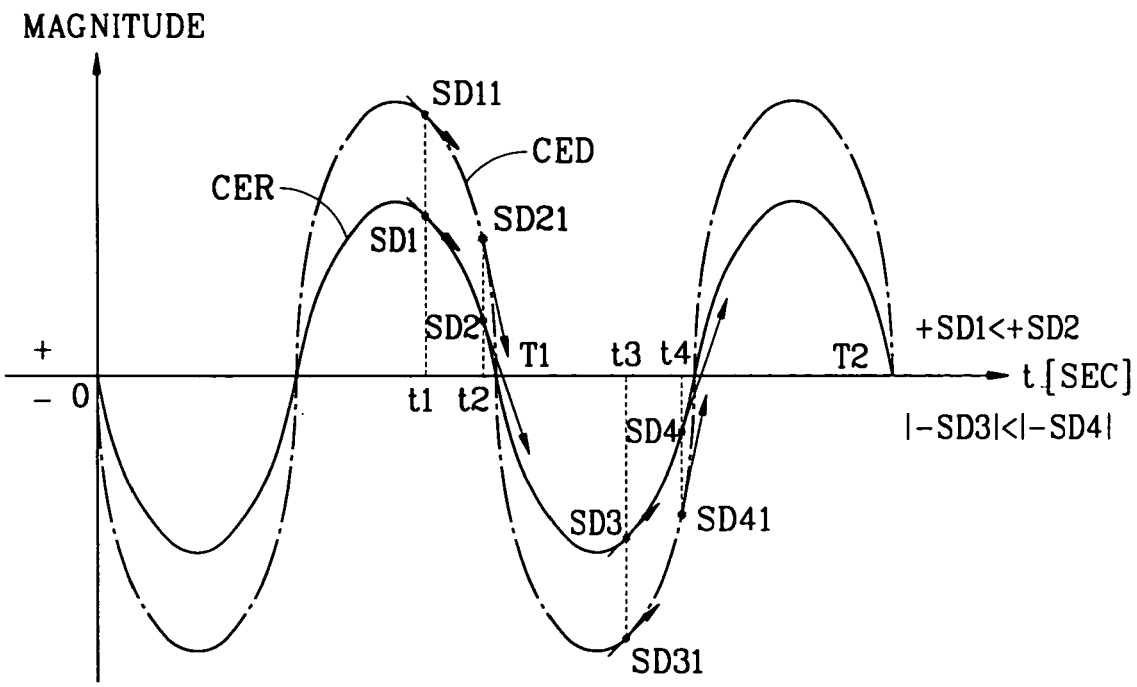
FIG. 12B is a wave form diagram illustrating an output signal of a position detection unit which detects the position of the objective lens.

FIG. 12B illustrates the output signal waveforms of the position detection unit for detecting the position of the objective lens in which each slope respectively is indicated by SD1, SD11, SD2, SD21, SD3, SD31, SD4 and SD41 corresponding to their respective positions at the times t1, t2, t3 and t4 in the reference signal CER and the detected signal CED, respectively. At this time, if the slope of the output signal of the photodetector is greater than a reference slope in the positive and negative values, the tracking of the objective lens is controlled by applying the back electromotive force. The above-described control method will be explained in detail with reference to FIG. 13.

Figure 13:
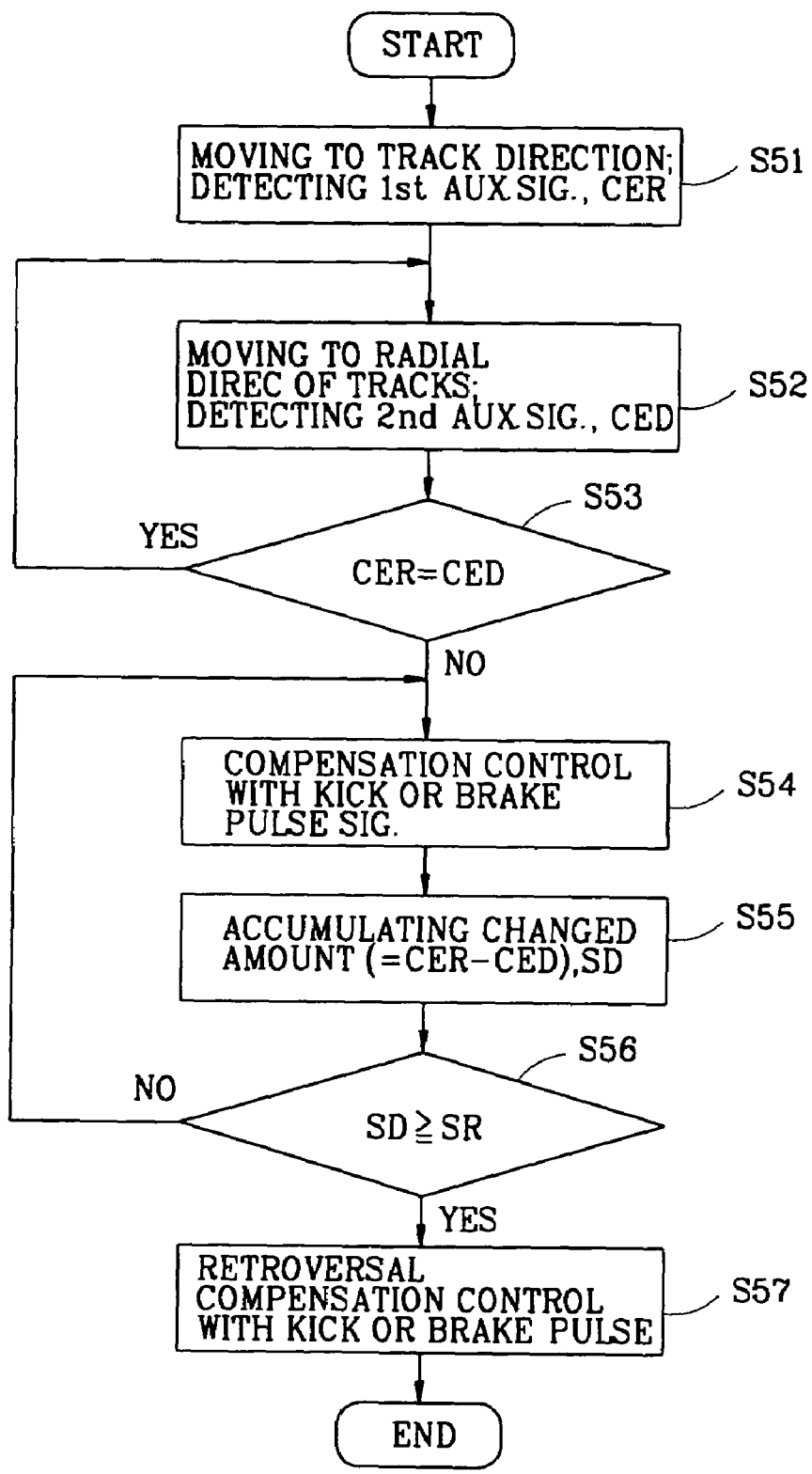
FIG. 13 is a flow chart illustrating a track access control method of an optical disc reproducer for controlling a tracking operation using a time-based variation of an objective lens in accordance with a fourth embodiment of the present invention.

FIG. 13 illustrates the steps for implementing a track access method for controlling the tracking using a time-based variation (slope) of the objective lens position. When the optical pick-up unit runs at a normal state (stable state), the optical pick-up unit is moved in the radial direction of the tracks for thereby detecting the first auxiliary signal ag(C–A) for a predetermined time, and the average value thereof is computed, and the reference value CER which is the average value of the first auxiliary signal ag is set in Step S51 in the normal state, and next, when the optical pick-up unit is moved at a high speed, the optical pick-up unit is moved in the radial direction of the track for thereby detecting the second auxiliary signal CED in Step S52, and the reference value CER and the detected second auxiliary signal CED are compared. As a result of the comparison, if the reference value CED and the second auxiliary signal CED are the same, Step S52 is repeatedly performed, and if the reference value CER and the second auxiliary signal CED are not the same, the next step is performed in Step S53. If the reference value CER and the second auxiliary signal CED are not the same, and the tracking error signal TE is generated, a kick pulse signal or brake pulse signal are outputted for thereby implementing a tracking compensation control in Step S54. At the same time, the differences between the reference value CER and the detected second auxiliary signal CED are accumulated for thereby generating a slope value SD which indicates the variation of the tracking error signal TE in Step S55. Next, the tracking error slope SD is compared with the reference slope value SR which was previously calculated in Step S56. As a result of the comparison, if the tracking error slope value SD is not greater than the reference slope SR, it is judged that the objective lens is greatly moved. The steps S54 and S56 are repeatedly performed until the tracking error slope SD becomes less than the reference slope SR. If the tracking error slope SD is less than the reference slop SR, the kick pulse or brake signal are applied in a reverse sequence for thereby performing a reverse compensation control in Step S57.

Figure 14A:
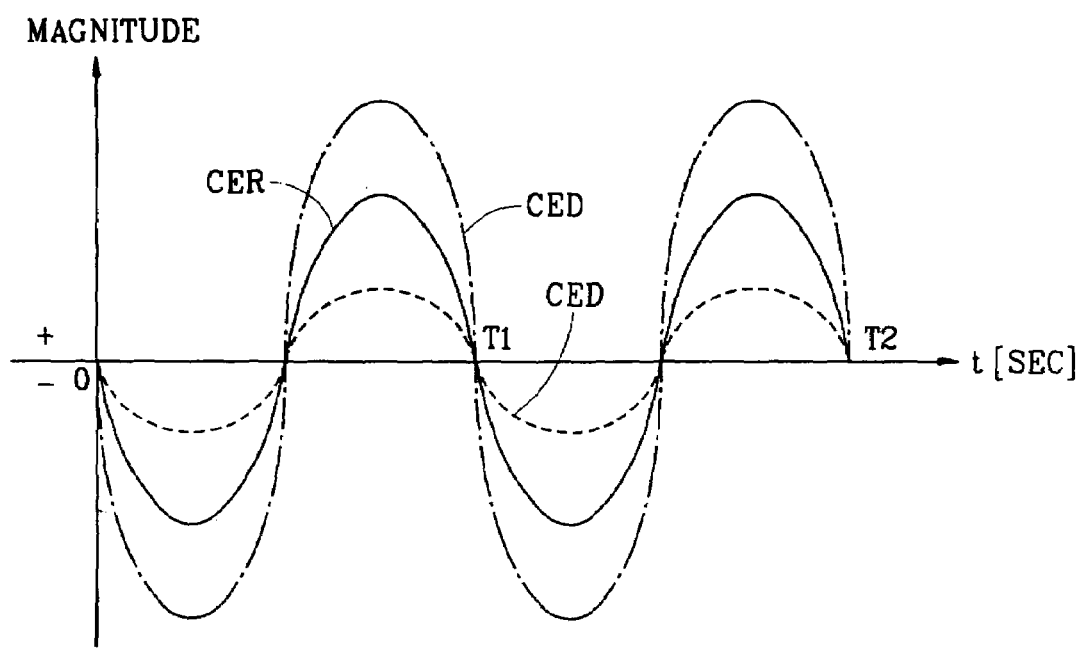
FIG. 14A illustrates the output signal waveforms of the photodetector for detecting the position of the objective lens when the optical pick-up unit of the optical disc reproducer moves in the radial direction of the tracks of the optical disc in a stable state.

FIG. 14A illustrates the output signal waveforms of the photodetector for detecting the position of the objective lens when the optical pick-up unit of the optical disc reproducer moves in the radial direction of the tracks of the optical disc in the stable state, which is the same as in FIG. 12A.

Figure 14B:
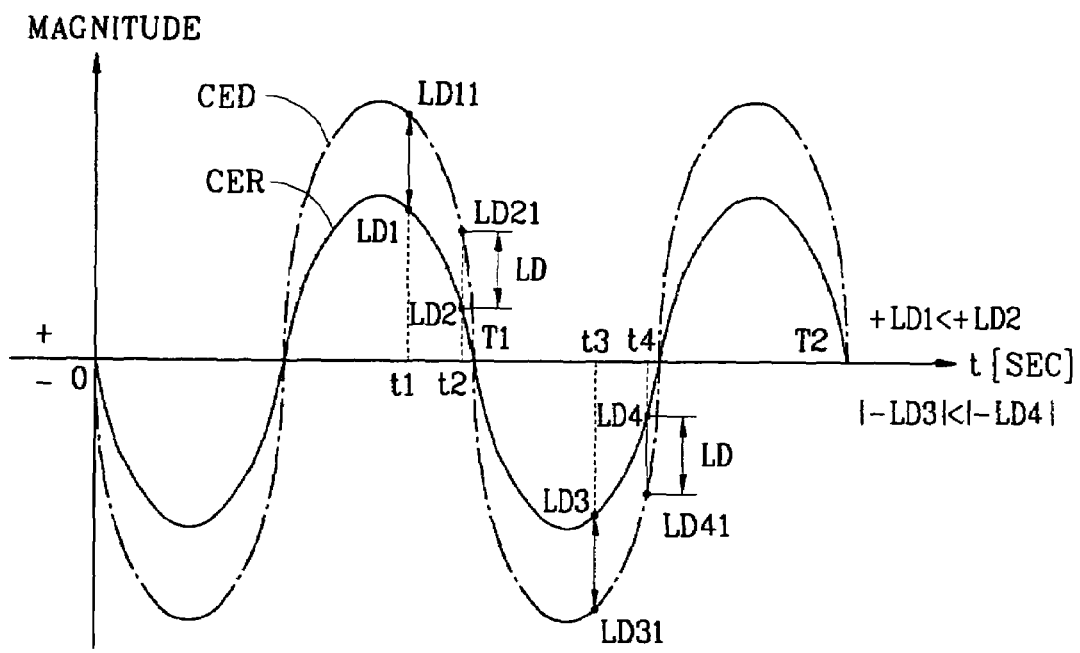
FIG. 14B is a wave form diagram illustrating an output signal of a position detection unit which detects the position of the objective lens.

FIG. 14B illustrates the output signal waveforms of the position detection unit for detecting the position of the objective lens in which each level is respectively indicated by LD1, LD11, LD2, LD21, LD3, LD31, LD4 and LD41 corresponding to their respective positions at the times t1, t2, t3 and t4 in the reference signal CER and the detected signal CED, respectively. At this time, if the slope of the output signal of the photodetector is larger than a reference slope in the positive and negative directions, the tracking of the objective lens is controlled by applying the back electromotive force.

As shown in FIG. 14B, at the positions t1, t2, t3 and t4, the vibration levels corresponding to each position are indicated as LD1, LD2, LD3 and LD4. At this time, the level of the vibration represented in the output signal of the photodetector is compared with a previously set vibration level for thereby applying a back electromotive force and controlling the tracking of the objective lens. The above-described method will be explained in more detail with reference to FIG. 15.

Figure 15:
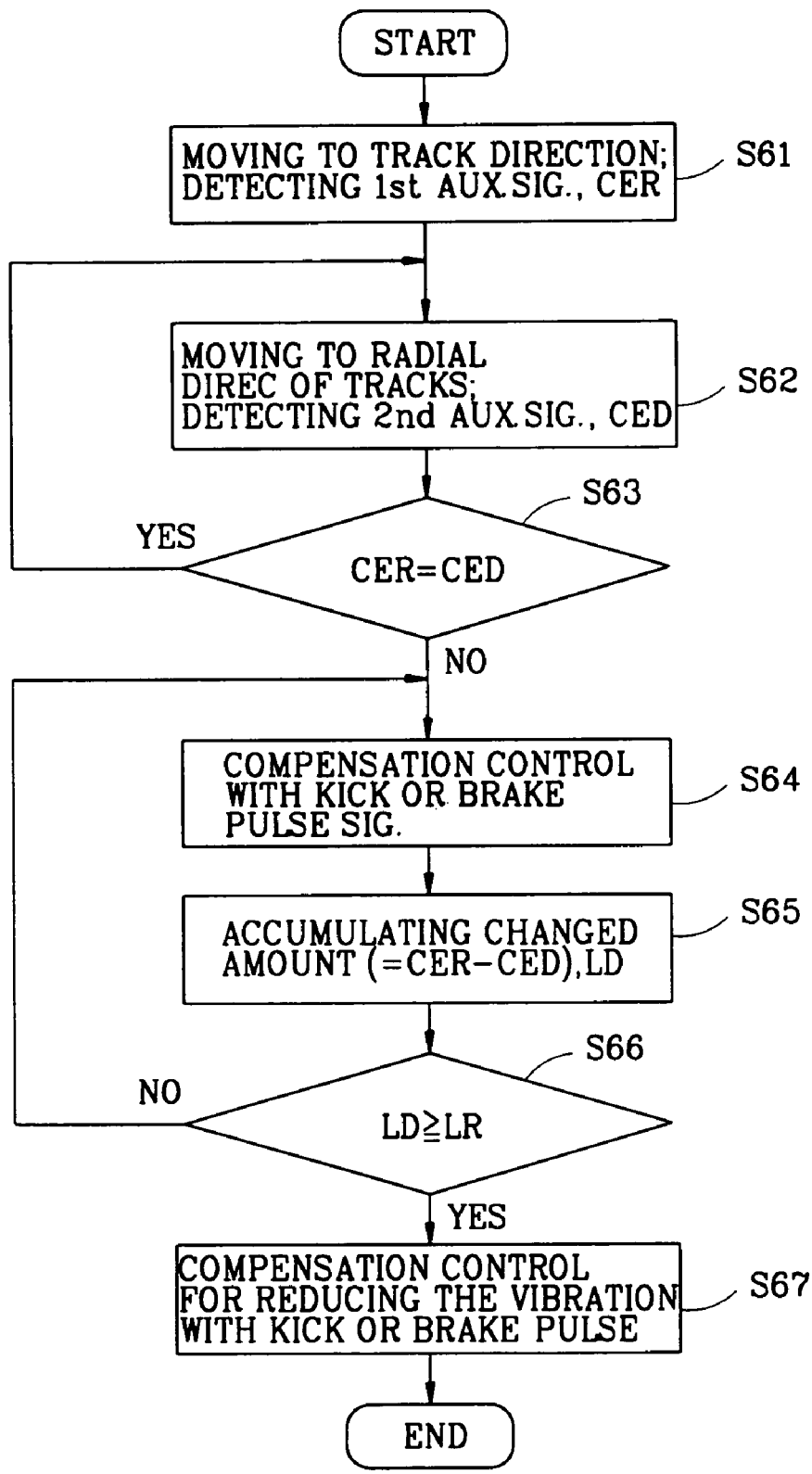
FIG. 15 is a flow chart illustrating a track access control method of an optical disc reproducer for controlling a tracking operation using a vibration level variation of an objective lens with respect to time according to a fifth embodiment of the present invention.

FIG. 15 is a flow chart illustrating the steps for implementing a track access method which is capable of controlling the tracking using a vibration level of the objective lens with respect to the elapsed time according to a fifth embodiment of the present invention. As shown therein, in Step S61 when the optical pick-up unit runs at a normal speed, the first auxiliary signals ag(C−A) are detected as the optical pick-up unit moves in the track direction for a predetermined time, and then the average value thereof is computed, and the thusly computed value is set as a reference value CER of the first auxiliary signal in the normal running state (stable state), and next, when the optical pick-up unit is moved at a high speed, as the optical pick-up unit is moved in the radial direction of the track, the second auxiliary signal CED is detected in Step S62. The reference value CER and the value of the second auxiliary signal CED are compared. As a result of the comparison, if the reference value CER and the value of the second auxiliary signal CED are the same, Step S62 is continuously repeated. If they are not the same, the next step is performed in Step S63. If the reference value CER and the value of the second auxiliary signal CED are not the same, namely, when the tracking error signal occurs, the kick pulse signal or the brake pulse signal are outputted for thereby implementing a tracking compensation control in Step S64. At the same time, the difference (CER−CED) between the reference value CER and the value of the second auxiliary signal CED is obtained and a vibration level value LD is generated by the difference in Step S65, and next, in Step S66 the vibration level value LD is compared with a reference level LR which was previously determined. If the vibration level LD is not greater than the reference level LR, Steps S64 and S65 are repeatedly performed. If the vibration level LD is less than or equal to the reference level LR, it is judged that the vibration of the objective lens is small, so that in Step S67 the kick pulse signal or the brake pulse signal are tracking-controlled using a shorter duration output signal than applied in Step S64, so that the pick-up unit is positioned at the destination track in which an information of the optical disc is recorded.

However, in the track access method which is capable of implementing a tracking control using the time-based variation(slope) of the objective lens position, if the tracking control is implemented so that the error signal at SD2 and SD4 is zero at the zero crossing point, the control signal applied based on the inertial force is too much increased, so that the error signal is generated not to correspond to the position at which the error signal becomes zero, whereby the distortion is too much increased.

In the track access method which is capable of implementing the tracking control using a vibration variation level of the objective lens position with respect to the elapsed time according to a fifth embodiment of the present invention, as illustrated in the drawings, LD1 and LD3 are displaced farther from the zero vibration level compared to LD2 and LD4, and LD1 and LD3 thus indicate the points at which the vibration is more greatly generated and thereby more compensation control need be performed, so that at LD2 and LD4, the tracking control signal is processed based on the decreased vibration level. If the tracking control is performed based on the magnitude of the back electromotive force so that the error signal becomes zero at the points LD2 and LD4, since the control signal applied based on the inertial force is increased, a level greatly different from the zero vibration level is obtained, so that the distortion is increased.

Another embodiment of the present invention which is provided for overcoming the problems encountered in the third and fourth embodiments of the present invention will be explained with reference to FIG. 16.

Figure 16:
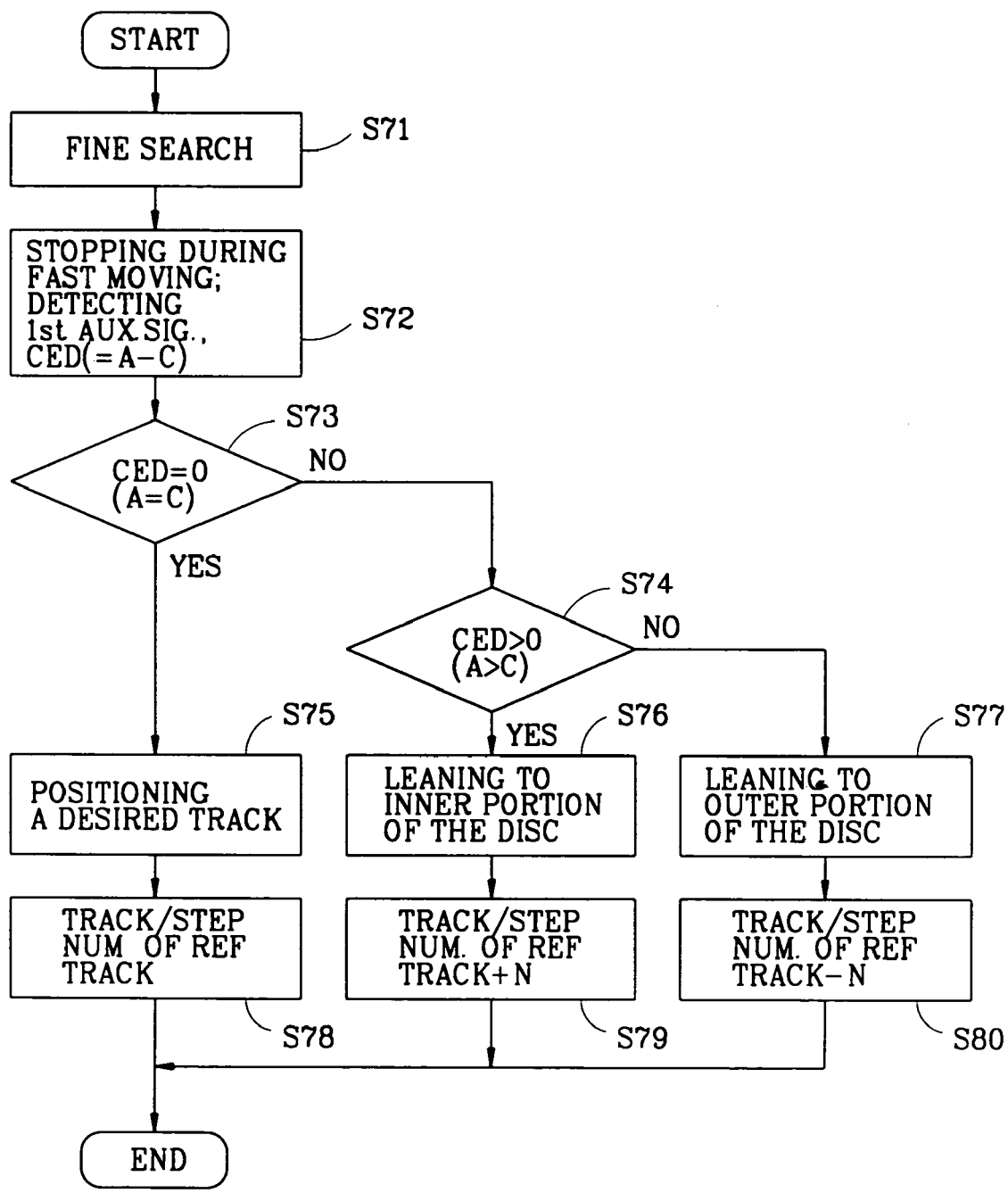
FIG. 16 is a flow chart illustrating a track access control method of an optical disc reproducer in the fine search mode in accordance with a sixth embodiment of the present invention.

FIG. 16 is a flow chart illustrating steps for implementing a track access method for an optical disc reproducerin the fine search mode according to a sixth embodiment of the present invention. After the first tracking control operation in which the optical pick-up unit is moved at a high speed is performed, when the reproducer is controlled so that the second tracking control operation is implemented for accurately moving the optical pick-up unit, tracking error occurs due to the inertia force. The method for preventing the above-mentioned problem that the tracking error occurs and implementing a fast fine search will be explained.

When the mode is switched to the second tracking control operation mode, namely, the fine search mode in Step S71, when the optical pick-up unit is moved at a high speed, and then is stopped, the first auxiliary signal CED, which has a magnitude and polarity which differ in accordance with the amount of the beam detected by the segmented photodetector, is outputted and then its value is stored in Step S72. It is judged that the objective lens is at the destination track when the value of CED is equal to zero in Step S73, and then the tracking control is implemented in Step S75 based on the number of the jump tracks per the moving track as a reference track number in Step S78, If the first auxiliary signal CED is judged larger than zero in Step S74, it is judged that the objective lens position is offset inwardly of the destination track of the position of the optical disc in Step S76, and the tracking control is implemented based on the number of the tracks higher than the jump track number per the moving track by N-tracks in Step S79. If the second auxiliary signal CED is judged less than zero in Step S74, it is judged that the objective lens position is offset outwardly of the destination track position of the optical disc in Step S77, so that the tracking control is implemented with respect to the jump track number per the moving track based on the number of tracks which is less than the number of the reference tracks by N-tracks in Step S80, so that it is possible to implement a fast and fine tracking control in the fine search mode.

In the tracking/controlled method according to the sixth embodiment of the present invention, when performing the tracking control of the DPD(Differential Phase Detection), and the optical pick-unit is moved across the tracks, the vibration level signal having a resonant frequency range of the tracking actuator is detected together with the reproducing signal for thereby detecting and compensating the objective lens vibration level of a low frequency.

Figure 17A:
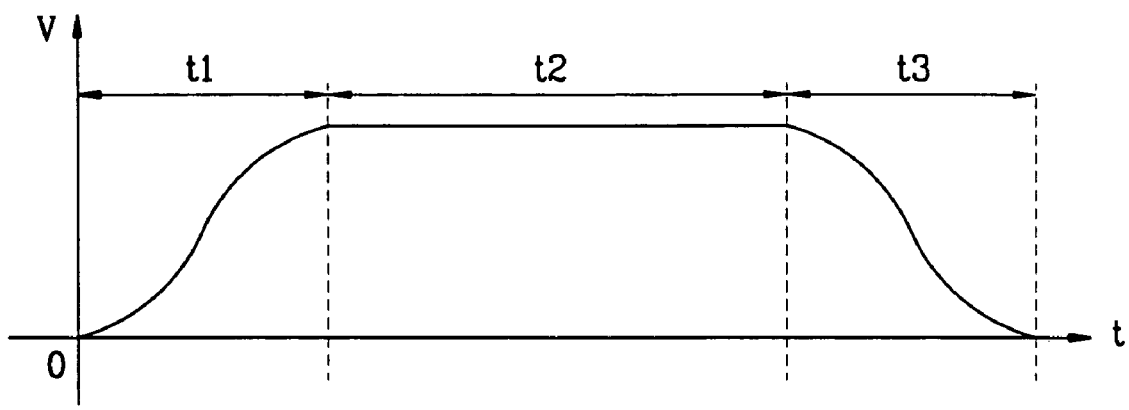
FIG. 17A is a graph illustrating the speed at which an optical pick-up unit is moved in a radial direction of the tracks, of an optical disc.

FIG. 17A illustrates a speed graph when the optical pick-up unit is moved in the radial direction of the tracks. As shown therein, there are provided an acceleration interval t1 over which the optical pick-up unit which was initially in the stopped state is moved, a constant speed interval t2 over which the optical pick-up unit is moved at a predetermined speed, and a deceleration interval t4 over which the optical pick-up unit which is moved at a constant speed is slowed and stopped.

Figure 17B:
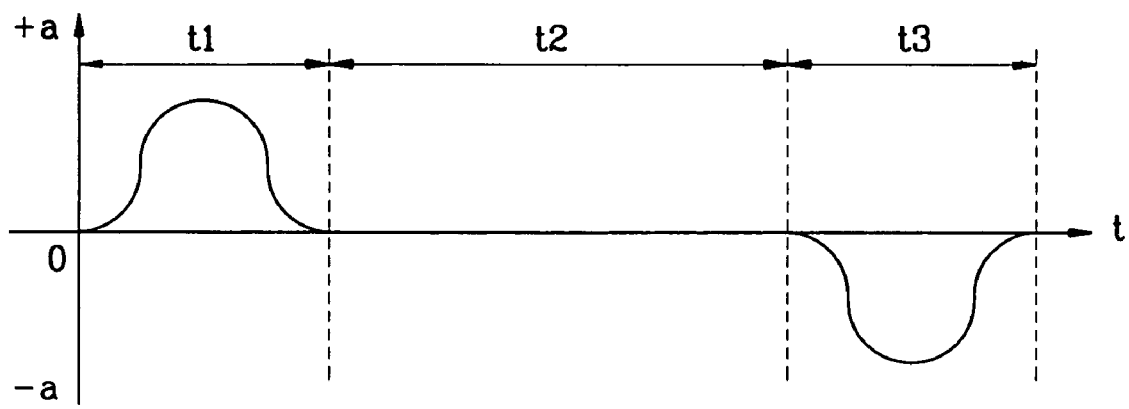
FIG. 17B is a graph illustrating an acceleration when an optical pick-up unit is moved in a radial direction of the tracks.

FIG. 17B illustrates an acceleration graph when the optical pick-up unit is moved in the radial direction of the tracks. As shown therein, there are provided an acceleration interval during which a force is applied to the objective lens or actuator of the optical pick-up unit, and a constant speed interval during which the force is not applied to the objective lens or the actuator. At this time, after the force is applied to the objective lens or the actuator, a vibration occurs in the actuator due to the inertial force of the optical pick-up unit. In particular, the tracking servo or the focusing servo may be lost due to the thusly generated vibration for thereby delaying the data search.

Figure 18:
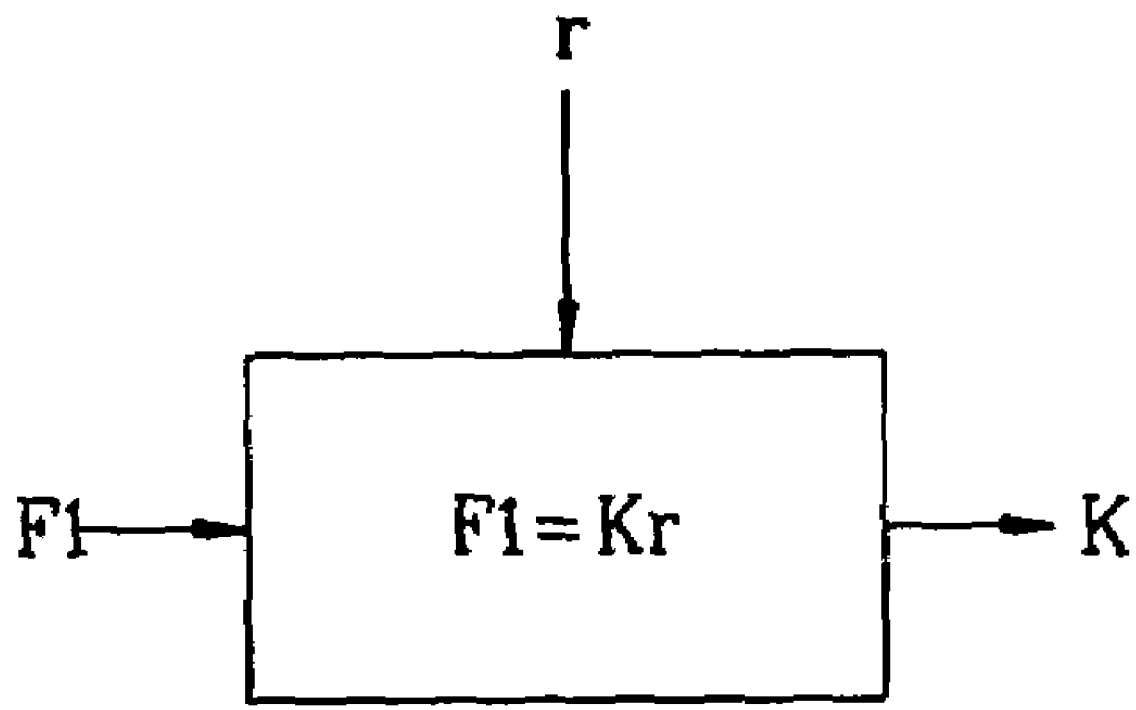
FIG. 18 is a block diagram for explaining the computation of an actuator characteristic value(K)

FIG. 18 is a view illustrating the computation of the characteristic value K of the actuator. The microcontroller receives a traverse signal TS from the traverse counter when the optical pick-up unit is moved across the tracks, for thereby obtaining the degree "r" of the distortion of the actuator. At this time, the degree "r" of the distortion is in proportion to the force applied to control the actuator. Therefore, since there is a proportional relationship between the force and the degree of the distortion, a proportional constant "K" is obtained, which represents a characteristic of the actuator. Therefore, the relation $F1=K*r$ is obtained between the force F1 applied to the actuator and the degree of the distortion of the actuator. Here, since the proportional constant K is determined based on the mechanical characteristics of the actuator and the force applied to the actuator, the proportional constant K is the characteristic value of the actuator. Therefore, when the characteristic value of the actuator is known, the driving operation is controlled based on the degree of the distortion of the actuator, so that it is possible to implement a parallel state of the actuator. The control method of the same will be explained with reference to the accompanying drawings.

Figure 19:
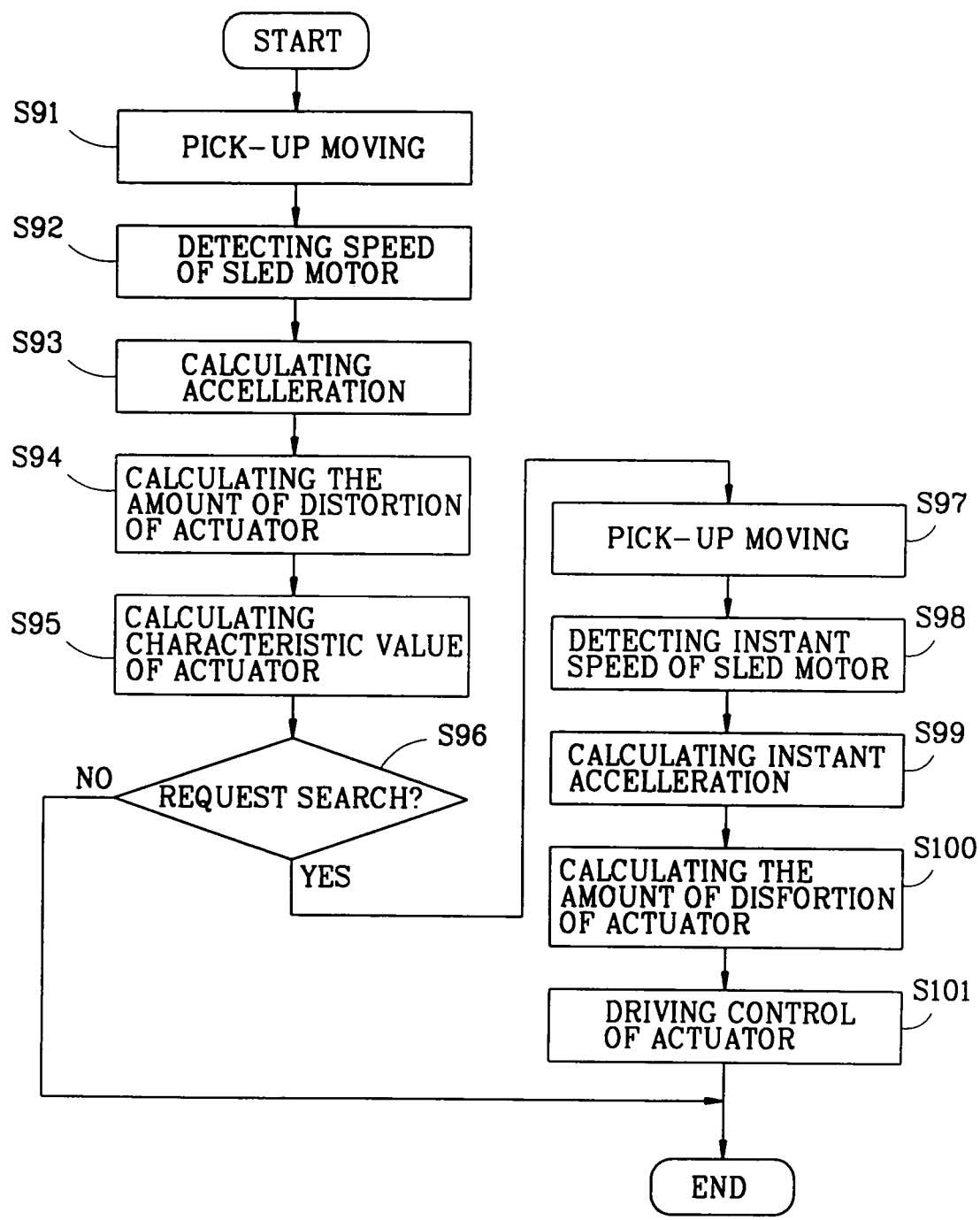
FIG. 19 is a flow chart illustrating a tracking control method of an optical disc reproducer utilizing the distortion of an actuator in accordance with a seventh embodiment of the present invention.

FIG. 19 is a flow chart illustrating steps for implementing the tracking control method using the degree "r" of the distortion of the actuator. As shown therein, the method includes a step for obtaining the characteristic value of the actuator, and a step for detecting the degree of the distortion of the actuator in accordance with a search request, in which step the optical pick-up unit rapidly accesses the destination track position of the optical disc. Each step will be explained in more detail.

When the optical pick-up unit is moved in Step S91, the microcontroller detects a pulse generation signal PG generated based on the rotation of the sled motor, and detects the moving speed vo of the optical pick-up unit which moves in the radial direction of the tracks based on the traverse signal TS in Step 92 for thereby computing the acceleration a0 of the optical pick-up unit in Step S93 based on the moving speed v0. At this time, since the acceleration a0 is generated when a force is applied to the optical pick-up unit, it is possible to calculate the force F0 applied to the optical pick-up unit based on Newton's law of motion($F=m*a$) based on the acceleration a0 and the mass mo of the optical pick-up unit. In addition, the force F1 applied to the actuator may be deduced based on the force F0 applied to the optical pick-up unit. Namely, F1 is obtained by multiplying the net mass m1 of the actuator(which is obtained by subtracting the mass m1 except for the actuator from the mass m0 of the entire portions of the optical pick-up unit) by the acceleration a0 of the optical pick-up unit. Next, the degree "r" of the distortion of the actuator is obtained based on the traverse signal TS in Step S94. Therefore, the microcontroller computes the characteristic value K of the actuator based on the force F1 corresponding to the acceleration a0 and the degree "r" of the distortion of the actuator in Step S95.

The microcontroller stores the characteristic force K of the actuator and in Step S96 judges whether there is a search request for searching the information recorded on the optical disc. If there is a search request, the optical pick-up unit is moved in the radial direction of the tracks in Step S97. At this time, the microcontroller detects the current moving speed of the optical pick-up unit in Step S98, and the current acceleration is computed in Step S99 based on the current moving speed. Since the current acceleration is directly related to the force by which the optical pick-up unit is moved, the degree "r" of the distortion of the actuator is computed in Step S100 based on the force and the characteristic value K of the actuator. The actuator is controlled in Step S101 based on the back electromotive force which is capable of controlling the actuator in accordance with the degree of the distortion, and the optical pick-up unit accesses the destination track at a high speed by off-setting compensating the distortion of the actuator.

In the above-described embodiment of the present invention, when traversing the optical pick-up unit at a high speed in the optical disc reproducer, the above-described access operation may be implemented under the control of the microcontroller without an additional apparatus.

In the track access apparatus and method according to the present invention, the slope of the detection signal from the position detection unit of the objective lens position which is capable of detecting the vibration of the objective lens, the level variation degree, and the degree of the distortion of the actuator are detected, and then the back electromotive force corresponding to each physical amount is generated, so that the back electromotive force is applied for compensating the force applied to the actuator. In addition, the vibration of the objective lens is prevented in maximum, so that the optical pick-up unit rapidly access the destination track of the optical disc for thereby searching a desired data.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An optical disc track access apparatus, comprising:
   a detection unit detecting an auxiliary signal from a reflected main beam from an optical disc while an optical pick-up unit is crossing the tracks of the optical disc, wherein the auxiliary signal represents an amount of off-center with respect to an objective lens of the optical pickup unit and is determined without the use of a tracking error signal; and
   a control unit controlling a driving operation of a tracking actuator in accordance with the detected auxiliary signal.

2. The apparatus of claim 1, wherein said detection unit includes an error signal generation unit generating an off-center error signal in accordance with the detected auxiliary signal, and wherein said control unit includes:
   a back electromotive force generation unit generating a back electromotive force corresponding to the off-center error signal, and
   a driving control unit controlling the driving operation of the tracking actuator in accordance with the generated back electromotive force.

3. The apparatus of claim 2, wherein said back electromotive force generation unit generates a back electromotive force in a direction for off-setting the error signal.

4. An optical disc track access apparatus for an optical disc reproducer, comprising:
   a first tracking control means for outputting a first tracking control signal based on a first auxiliary signal generated in accordance with the track direction movement of an optical pick-up unit of the optical disc reproducer;
   a second tracking control means for outputting a second tracking control signal in accordance with a second auxiliary signal of the frequency less than the frequency of the first auxiliary signal generated based on the movement of the optical pick-up unit in a radial direction of the tracks of the optical disc being reproduced; and
   a switching means for selecting one among the first and second tracking control signals and outputting the thusly selected signal in accordance with a track search request.

5. The apparatus of claim 4, wherein said second tracking control means includes:
   an auxiliary signal detection means for detecting the second auxiliary signal of the resonant frequency range corresponding to a vibration of a tracking actuator of the optical disc reproducer based on the detection amount of a plurality of beam spot regions reflected from the optical disc; and
   an error signal generation means for generating a tracking error signal in accordance with the second auxiliary signal.

6. The apparatus of claim 4, wherein said tracking control means generates a back electromotive force corresponding to the first and second auxiliary signals, and outputs the generated back electromotive force as a driving signal of the tracking actuator.

7. An optical disc track access apparatus, comprising:
   an auxiliary signal detection unit detecting an auxiliary signal when a track search of an optical disc is performed, wherein the detection unit detects the auxiliary signal from a main beam reflected from the optical disc, which represents an amount of off-center with respect to an objective lens and is determined without the use of a tracking error signal;
   an error signal generation unit generating an off-center error signal in accordance with the auxiliary signal; and
   a driving control unit controlling a driving signal of a tracking actuator, wherein the driving signal generates a back electromotive force corresponding to the off-center error signal.

8. An optical disc track access method, comprising the steps of:
   receiving a main beam reflected from an optical disc;
   detecting an auxiliary signal from the main beam while an optical pick-up unit is crossing the tracks of the optical disc when a track search is performed, wherein the auxiliary signal represents an amount of off-center with respect to an objective lens of the optical pickup unit and is determined without the use of a tracking error signal; and
   controlling a driving operation of a tracking actuator in accordance with the auxiliary signal.

9. The method of claim 8, wherein said controlling step includes:
   generating a back electromotive force corresponding to the auxiliary signal; and
   controlling a driving signal of the tracking actuator in accordance with the generated back electromotive force.

* * * * *